US010691554B2

(12) United States Patent
DeSantis et al.

(10) Patent No.: US 10,691,554 B2
(45) Date of Patent: Jun. 23, 2020

(54) PROVIDING ACCESS TO STORED COMPUTING SNAPSHOTS

(71) Applicant: Amazon Technologies, Inc., Reno, NV (US)

(72) Inventors: Peter N. DeSantis, Cape Town (ZA); Atle Normann Jorgensen, Cape Town (ZA); Matthew S. Garman, Seattle, WA (US); Tate Andrew Certain, Seattle, WA (US); Roland Paterson-Jones, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/424,574

(22) Filed: Feb. 3, 2017

(65) Prior Publication Data

US 2017/0147449 A1 May 25, 2017

Related U.S. Application Data

(63) Continuation of application No. 14/246,876, filed on Apr. 7, 2014, now Pat. No. 9,569,123, which is a (Continued)

(51) Int. Cl.
*G06F 11/14* (2006.01)
*G06F 3/06* (2006.01)
*G06F 11/20* (2006.01)

(52) U.S. Cl.
CPC .......... *G06F 11/1464* (2013.01); *G06F 3/065* (2013.01); *G06F 3/067* (2013.01);
(Continued)

(58) Field of Classification Search
CPC . G04G 17/02; G06F 11/1461; G06F 11/1464; G06F 11/2071; G06F 3/0619; G06F 3/0622; G06F 3/065; G06F 3/067
(Continued)

(56) References Cited

U.S. PATENT DOCUMENTS 5,771,354 A  6/1998 Crawford
6,799,260 B1  9/2004 Tunali et al.
(Continued)

OTHER PUBLICATIONS

"ElasticDrive—Distributed Remote Storage System," retrieved Aug. 19, 2008, from http://www.elasticdrive.com/, 2 pages.
(Continued)

*Primary Examiner* — Yaima Rigol
(74) *Attorney, Agent, or Firm* — Robert C. Kowert; Kowert, Hood, Munyon, Rankin & Goetzel, P.C.

(57) ABSTRACT

Techniques are described for managing access of executing programs to non-local block data storage. In some situations, a block data storage service uses multiple server storage systems to reliably store copies of network-accessible block data storage volumes that may be used by programs executing on other physical computing systems, and snapshot copies of some volumes may also be stored (e.g., on remote archival storage systems). A group of multiple server block data storage systems that store block data volumes may in some situations be co-located at a data center, and programs that use volumes stored there may execute on other computing systems at that data center, while the archival storage systems may be located outside the data center. The snapshot copies of volumes may be used in various ways, including to allow users to obtain their own copies of other users' volumes (e.g., for a fee).

16 Claims, 13 Drawing Sheets

Related U.S. Application Data continuation of application No. 12/188,952, filed on Aug. 8, 2008, now Pat. No. 8,725,967.

(52) U.S. Cl.
CPC .......... *G06F 3/0619* (2013.01); *G06F 3/0622* (2013.01); *G06F 11/1461* (2013.01); *G06F 11/2071* (2013.01); *G06F 2201/84* (2013.01)

(58) Field of Classification Search
USPC .......................... 711/161–162, 147–148, 153
See application file for complete search history.

(56) References Cited

U.S. PATENT DOCUMENTS

| | | | |
|---|---|---|---|
| 6,912,548 B1* | 6/2005 | Black | G06F 16/10 709/229 |
| 6,915,354 B1 | 7/2005 | Ozdemir et al. | |
| 6,973,516 B1 | 12/2005 | Athanas et al. | |
| 6,993,935 B2 | 2/2006 | Leidy et al. | |
| 7,007,043 B2 | 2/2006 | Farmer et al. | |
| 7,072,823 B2 | 7/2006 | Athanas et al. | |
| 7,085,883 B1 | 8/2006 | Dalgic et al. | |
| 7,254,682 B1 | 8/2007 | Arbon | |
| 7,624,155 B1 | 11/2009 | Nordin et al. | |
| 7,747,836 B2 | 6/2010 | Rajan et al. | |
| 8,055,613 B1* | 11/2011 | Mu | G06F 16/1734 707/610 |
| 2002/0069369 A1 | 6/2002 | Tremain | |
| 2004/0117311 A1 | 6/2004 | Agarwal et al. | |
| 2004/0250033 A1* | 12/2004 | Prahlad | G06F 11/1451 711/162 |
| 2004/0254936 A1 | 12/2004 | Mohamed | |
| 2004/0260658 A1 | 12/2004 | Dettinger et al. | |
| 2006/0179143 A1 | 8/2006 | Walker et al. | |
| 2007/0094466 A1 | 4/2007 | Sharma et al. | |
| 2007/0156982 A1 | 7/2007 | Meiri et al. | |
| 2007/0198605 A1* | 8/2007 | Saika | G06F 17/30088 |
| 2007/0233606 A1 | 10/2007 | Zweig et al. | |
| 2009/0077124 A1* | 3/2009 | Spivack | G06Q 30/02 |
| 2009/0222496 A1* | 9/2009 | Liu | G06F 3/0482 |

OTHER PUBLICATIONS

"ElasticDrive—Features," retrieved Aug. 19, 2008, from http://www.elasticdrive.com/features.html, 2 pages.

"Global File System," retrieved Aug. 19, 2008, from http://en.wikipedia.org/wiki/Global_File_System, 2 pages.

"Hierarchical Storage Management," retrieved Aug. 19, 2008, from http://en.wikipedia.org/wiki/Hierarchical_storage_management, 2 pages.

"IDRIVE features complete hands-free automated online backup application," retrieved Aug. 19, 2008, from http://www.idrive.com/online-backup-features.htm, 2 pages.

"ISCSI," retrieved Aug. 19, 2008, from http://en.wikipedia.org/wiki/Iscsi, 6 pages "MobileMe iDisk," retrieved Aug. 19, 2008, from http://www.apple.com/mobileme/features/idisk.html, 2 pages.

"NetApp," retrieved Aug. 19, 2008, from http://en.wikipedia.org/wiki/Netapp, 3 pages.

"PersistentFS.com—Online Cloud Storage," retrieved Aug. 19, 2008, from http://www.persistentfs.com, 3 pages.

"Shared Disk File System," retrieved Aug. 19, 2008, from https://en.wikipedia.org/wiki/Cluster_File_System, 2 pages.

Aboba et al., "Securing Block Storage Protocols Over IP," 2004, retrieved on Aug. 19, 2008, from http://www.rfc-editor.org/rfc/rfc3723.txt, 66 pages.

Fegreus, "iSCSI Redirection," Apr. 15, 2008, retrieved on Aug. 19, 2008, from http://www.open-mag.com/features/Vol_132/rasilient/rasilient.html, 8 pages.

Geiger, "Perforce With Network Appliance Storage," Oct. 23, 2001, retrieved on Aug. 19, 2008, from http://www.perforce.com/perforce/conferences/us/2001/geiger/wprmg.html, 18 pages.

Komiega, "Startup Offers Full IP SAN System," Apr. 7, 2003, retrieved on Aug. 19, 2008, from http://searchstorage.techtarget.com/news/article/0,289142,sid5_gci892537,00.html, 2 pages.

Vogels, "Persistent Storage for Amazon EC2," Apr. 13, 2008, retrieved on Jul. 3, 2008, from http://www.allthingsdistributed.com/2008/04/persistent_storage_for_amazon.html, 2 pages.

\* cited by examiner

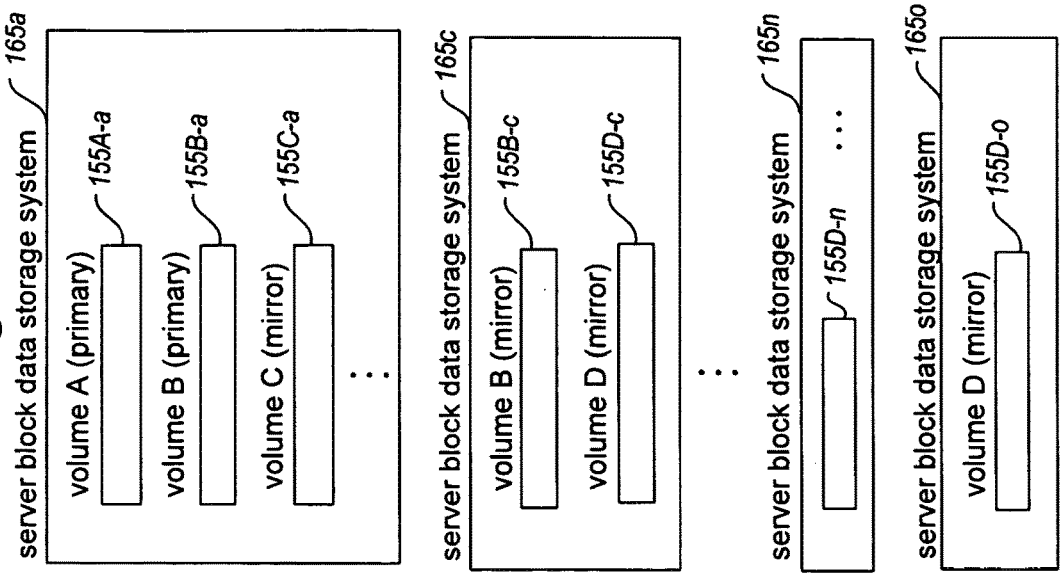
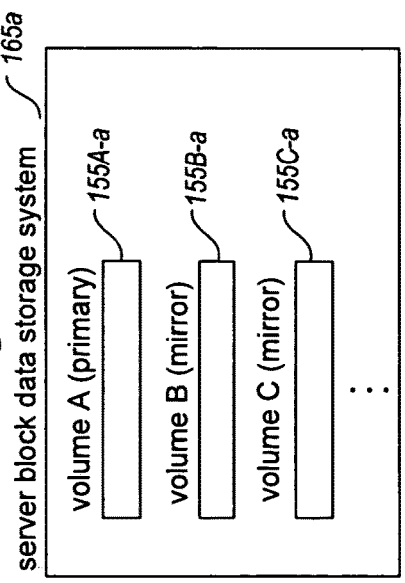
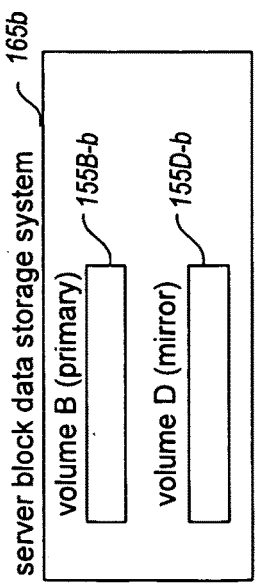
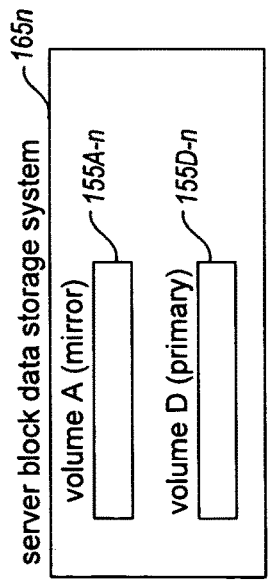

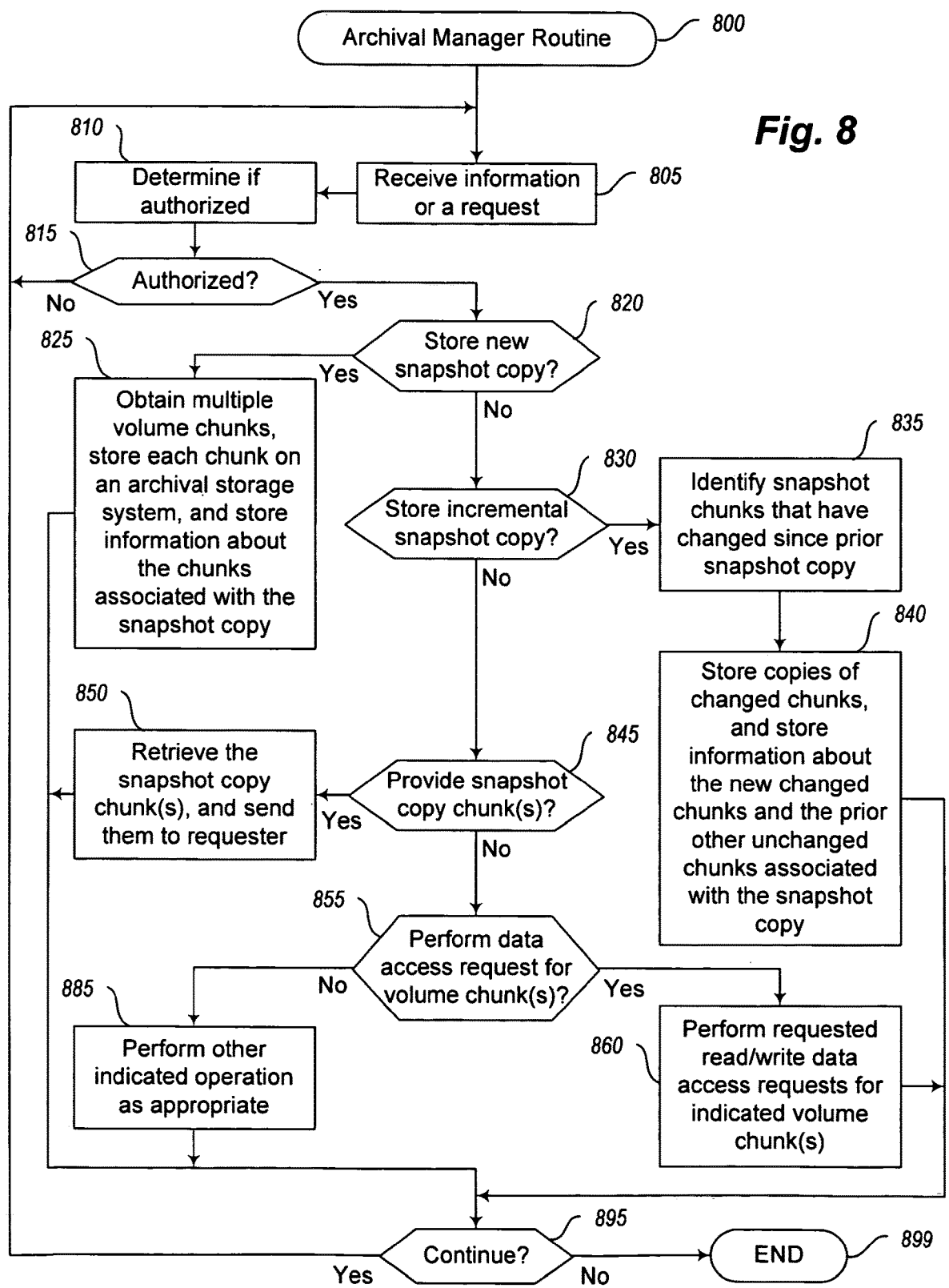

PROVIDING ACCESS TO STORED COMPUTING SNAPSHOTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of co-located interconnected computing systems have become commonplace, such as private data centers that are operated by and on behalf of a single organization, and public data centers that are operated by entities as businesses. Some public data center operators provide network access, power, and secure installation facilities for hardware owned by various customers, while other public data center operators provide "full service" facilities that also include hardware resources made available for use by their customers. However, as the scale and scope of typical data centers and computer networks has increased, the task of provisioning, administering, and managing the associated physical computing resources has become increasingly complicated.

The advent of virtualization technologies for commodity hardware has provided some benefits with respect to managing large-scale computing resources for many customers with diverse needs, allowing various computing resources to be efficiently and securely shared between multiple customers. For example, virtualization technologies such as those provided by XEN, VMWare, or User-Mode Linux may allow a single physical computing system to be shared among multiple users by providing each user with one or more virtual machines hosted by the single physical computing system, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies provide virtual resources that span one or more physical resources, such as a single virtual machine with multiple virtual processors that actually spans multiple distinct physical computing systems.

BRIEF DESCRIPTION OF THE DRAWINGS

FIGS. 2A-2F illustrate examples of providing reliable non-local block data storage functionality to clients.

FIG. 8 illustrates a flow diagram of an example embodiment of a Block Data Storage Archival Manager routine.

DETAILED DESCRIPTION

Figure 1:
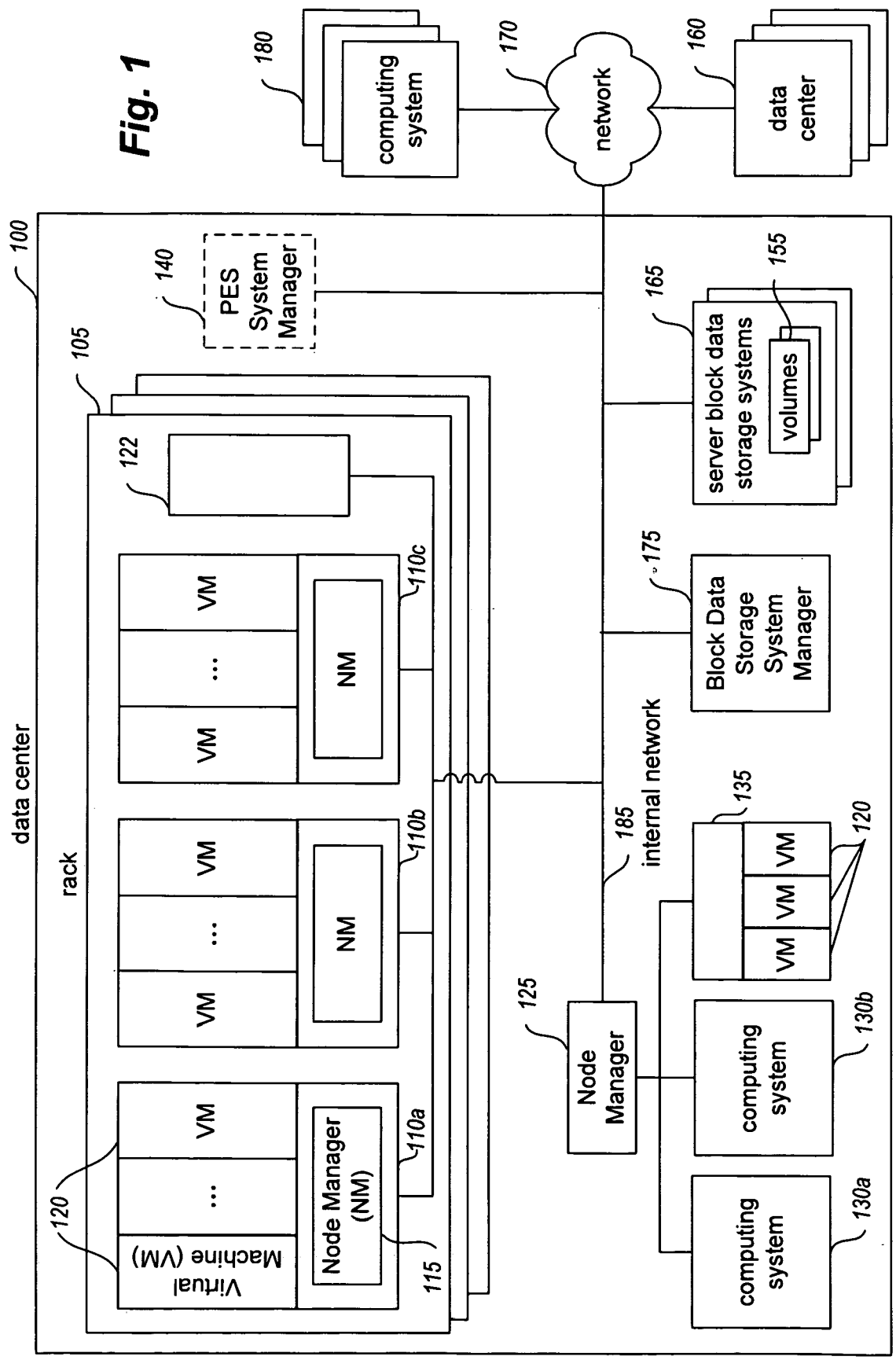
FIG. 1 is a network diagram illustrating an example embodiment in which multiple computing systems execute programs and access reliable non-local block data storage.

Techniques are described for managing access of executing programs to non-local block data storage. In at least some embodiments, the techniques include providing a block data storage service that uses multiple server storage systems to reliably store block data that may be accessed and used over one or more networks by programs executing on other physical computing systems. Users of the block data storage service may each create one or more block data storage volumes that each have a specified amount of block data storage space, and may initiate use of such a block data storage volume (also referred to as a "volume" herein) by one or more executing programs, with at least some such volumes having copies stored by two or more of the multiple server storage systems so as to enhance volume reliability and availability to the executing programs. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a volume stored on a server block data storage system in a data center may execute on one or more other physical computing systems at that data center. Additional details related to embodiments of a block data storage service are included below, and at least some of the described techniques for providing a block data storage service may be automatically performed by embodiments of a Block Data Storage ("BDS") System Manager module.

In addition, in at least some embodiments, executing programs that access and use one or more such non-local block data storage volumes over one or more networks may each have an associated node manager that manages the access to those non-local volumes by the program, such as a node manager module that is provided by the block data storage service and/or that operates in conjunction with one or more BDS System Manager modules. For example, a first user who is a customer of the block data storage service may create a first block data storage volume, and execute one or more program copies on one or more computing nodes that are instructed to access and use the first volume (e.g., in a serial manner, in a simultaneous or other overlapping manner, etc.). When a program executing on a computing node initiates use of a non-local volume, the program may mount or otherwise be provided with a logical block data storage device that is local to the computing node and that represents the non-local volume, such as to allow the executing program to interact with the local logical block data storage device in the same manner as any other local hard drive or other physical block data storage device that is attached to the computing node (e.g., to perform read and write data access requests, to implement a file system or database or other higher-level data structure on the volume, etc.). For example, in at least some embodiments, a representative logical local block data storage device may be made available to an executing program via use of GNBD ("Global Network Block Device") technology. In addition, as discussed in greater detail below, when the executing program interacts with the representative local logical block data storage device, the associated node manager may manage those interactions by communicating over one or more networks with at least one of the server block data storage systems that stores a copy of the associated non-local volume (e.g., in a manner transparent to the executing program and/or computing node) so as to perform the interactions on that stored volume copy on behalf of the executing program. Furthermore, in at least some embodiments, at least some of the described techniques for managing access of executing programs to non-local block data storage volumes are automatically performed by embodiments of a Node Manager module.

In addition, in at least some embodiments, at least some block data storage volumes (or portions of those volumes) may further be stored on one or more remote archival storage systems that are distinct from the server block data storage systems used to store volume copies. In various embodiments, the one or more remote archival storage systems may be provided by the block data storage service (e.g., at a location remote from a data center or other geographical location that has a pool of co-located server block data storage systems), or instead may be provided by a remote long-term storage service and used by the block data storage, and in at least some embodiments the archival storage system may store data in a format other than block data (e.g., may store one or more chunks or portions of a volume as distinct objects). Such archival storage systems may be used in various manners in various embodiments to provide various benefits, as discussed in greater detail below. In some embodiments in which a remote long-term storage service provides the archival storage systems, users of the block data storage service (e.g., customers of the block data storage service who pay fees to use the block data storage service) who are also users of the remote long-term storage service (e.g., customers of the remote long-term storage service who pay fees to use the remote long-term storage service) may have at least portions of their block data storage volumes stored by the archival storage systems, such as in response to instructions from those customers. In other embodiments, a single organization may provide at least some of both block data storage service capabilities and remote long-term storage service capabilities (e.g., in an integrated manner, such as part of a single service), while in yet other embodiments the block data storage service may be provided in environments that do not include the use of archival data storage systems. Furthermore, in at least some embodiments, the use of the archival storage systems is automatically performed under control of one or more archival manager modules, such as an archival manager module provided by the block data storage service or otherwise provided to operate in conjunction with modules of the block data storage service (e.g., provided by the remote long-term storage service to interact with the block data storage service).

In some embodiments, at least some of the described techniques are performed on behalf of a program execution service that manages execution of multiple programs on behalf of multiple users of the program execution service. In some embodiments, the program execution service may have groups of multiple co-located physical host computing systems in or more geographic locations, such as in one or more geographically distributed data centers, and may execute users' programs on those physical host computing systems, such as under control of a program execution service ("PES") system manager, as discussed in greater detail below. In such embodiments, users of the program execution service (e.g., customers of the program execution service who pay fees to use the program execution service) who are also users of the block data storage service may execute programs that access and use non-local block data storage volumes provided via the block data storage service. In other embodiments, a single organization may provide at least some of both program execution service capabilities and block data storage service capabilities (e.g., in an integrated manner, such as part of a single service), while in yet other embodiments the block data storage service may be provided in environments that do not include a program execution service (e.g., internally to a business or other organization to support operations of the organization).

In addition, the host computing systems on which programs execute may have various forms in various embodiments. Multiple such host computing systems may, for example, be co-located in a physical location (e.g., a data center), and may be managed by multiple node manager modules that are each associated with a subset of one or more of the host computing systems. At least some of the host computing systems may each include sufficient computing resources (e.g., volatile memory, CPU cycles or other CPU usage measure, network bandwidth, swap space, etc.) to execute multiple programs simultaneously, and, in at least some embodiments, some or all of the computing systems may each have one or more physically attached local block data storage devices (e.g., hard disks, tape drives, etc.) that can be used to store local copies of programs to be executed and/or data used by such programs. Furthermore, at least some of the host computing systems in some such embodiments may each host multiple virtual machine computing nodes that each may execute one or more programs on behalf of a distinct user, with each such host computing system having an executing hypervisor or other virtual machine monitor that manages the virtual machines for that host computing system. For host computing systems that execute multiple virtual machines, the associated node manager module for the host computing system may in some embodiments execute on at least one of multiple hosted virtual machines (e.g., as part of or in conjunction with the virtual machine monitor for the host computing system), while in other situations a node manager may execute on a physical computing system distinct from one or more other host computing systems being managed.

The server block data storage systems on which volumes are stored may also have various forms in various embodiments. As previously noted, multiple such server block data storage systems may, for example, be co-located in a physical location (e.g., a data center), and may be managed by one or more BDS System Manager modules. In at least some embodiments, some or all of the server block data storage systems may be physical computing systems similar to the host computing systems that execute programs, and in some such embodiments may each execute server storage system software to assist in the provision and maintenance of volumes on those server storage systems. For example, in at least some embodiments, one or more of such server block data storage computing systems may execute at least part of the BDS System Manager, such as if one or more BDS System Manager modules are provided in a distributed peer-to-peer manner by multiple interacting server block data storage computing systems. In other embodiments, at least some of the server block data storage systems may be network storage devices that may lack some I/O components and/or other components of physical computing systems, such as if at least some of the provision and maintenance of volumes on those server storage systems is performed by other remote physical computing systems (e.g., by a BDS System Manager module executing on one or more other computing systems). In addition, in some embodiments, at least some server block data storage systems each maintains multiple local hard disks, and stripes at least some volumes across a portion of each of some or all of the local hard disks. Furthermore, various types of techniques for creating and using volumes may be used, including in some embodiments to use LVM ("Logical Volume Manager") technology.

As previously noted, in at least some embodiments, some or all block data storage volumes each have copies stored on two or more distinct server block data storage systems, such as to enhance reliability and availability of the volumes. By doing so, failure of a single server block data storage system may not cause access of executing programs to a volume to be lost, as use of that volume by those executing programs may be switched to another available server block data storage system that has a copy of that volume. In such embodiments, consistency may be maintained between the multiple copies of a volume on the multiple server block data storage systems in various ways. For example, in some embodiments, one of the server block data storage systems is designated as storing the primary copy of the volume, and the other one or more server block data storage systems are designated as storing mirror copies of the volume—in such embodiments, the server block data storage system that has the primary volume copy (referred to as the "primary server block data storage system" for the volume) may receive and handle data access requests for the volume, and in some such embodiments may further take action to maintain the consistency of the other mirror volume copies (e.g., by sending update messages to the other server block data storage systems that provide the mirror volume copies when data in the primary volume copy is modified, such as in a master-slave computing relationship manner). Various types of volume consistency techniques may be used, with additional details included below.

In at least some embodiments, the described techniques include providing reliable and available access of an executing program on a computing node to a block data storage volume by managing use of the primary and mirror copies of the volume. For example, the node manager for the executing program may in some embodiments interact solely with the primary volume copy via the primary server block data storage system, such as if the primary volume copy is responsible for maintaining the mirror volume copies or if another replication mechanism is used. In such embodiments, if the primary server block data storage system fails to respond to a request sent by the node manager (e.g., a data access request initiated by the executing program, a ping message or other request initiated by the node manager to periodically check that the primary server block data storage system is available, etc.) within a predefined amount of time, or if the node manager is otherwise alerted that the primary volume copy is unavailable (e.g., by a message from the BDS System Manager), the node manager may automatically switch its interactions to one of the mirror volume copies on a mirror server block data storage system (e.g., with the executing program being unaware of the switch, other than possibly waiting for a slightly longer time to obtain a response to a data access request made by the executing program if it was that data access request that timed out and initiated the switch to the mirror volume copy). The mirror volume copy may be selected in various ways, such as if it is the only one, if an order in which to access multiple mirror volume copies was previously indicated, by interacting with the BDS System Manager to request an indication of which mirror volume copy is promoted to act as the primary volume copy, etc. In other embodiments, at least some volumes may have multiple primary copies, such as if a volume is available for simultaneous read access by multiple executing programs and the resulting data access load is spread across multiple primary copies of the volume—in such embodiments, a node manager may select one of the multiple primary volume copies with which to interact in various ways (e.g., in a random manner, based on an instruction from a BDS System Manager module, etc.).

In addition, the BDS System Manager may take various actions in various embodiments to maintain reliable and available access of an executing program on a computing node to a block data storage volume. In particular, if the BDS System Manager becomes aware that a particular server block data storage system (or a particular volume on a particular server block data storage system) becomes unavailable, the BDS System Manager may take various actions for some or all volumes stored by that server block data storage system (or for the particular unavailable volume) to maintain its availability. For example, for each stored primary volume copy on the unavailable server block data storage system, the BDS System Manager may promote one of the existing mirror volume copies to be the new primary volume copy, and optionally notify one or more node managers of the change (e.g., the node managers for any executing programs that are currently using the volume). Furthermore, for each stored volume copy, the BDS System Manager may initiate creation of at least one other new mirror copy of the volume on a different server block data storage system, such as by replicating an existing copy of the volume on another available server block data storage system that has an existing copy (e.g., by replicating the primary volume copy). In addition, in at least some embodiments, other benefits may be achieved in at least some situations by using at least portions of a volume that are stored on remote archival storage systems to assist in replicating a new mirror copy of the volume (e.g., greater data reliability, an ability to minimize an amount of storage used for mirror volume copies and/or ongoing processing power used to maintain full mirror copies of volumes, etc.), as discussed in greater detail below.

The BDS System Manager may become aware of the unavailability of a server block data storage system in various ways, such as based on a message from a node manager that cannot contact the server block data storage system, based on a message from the server block data storage system (e.g., to indicate that it has suffered an error condition, has begun a shutdown or failure mode operation, etc.), based on an inability to contact the server block data storage system (e.g., based on periodic or constant monitoring of some or all of the server block data storage systems), etc. Furthermore, unavailability of a server block data storage system may be caused by various occurrences in various embodiments, such as failure of one or more hard disks or other storage mediums on which the server block data storage system stores at least a portion of one or more volumes, failure of one or more other components of the server block data storage system (e.g., the CPU, memory, a fan, etc.), an electrical power failure to the server block data storage system (e.g., a power failure to a single server block data storage system, to a rack of multiple server block data storage systems, to an entire data center, etc.), a network or other communication failure that prevents the server block data storage system from communicating with a node manager and/or the BDS System Manager, etc. In some embodiments, failure of or problems with any component of a server block data storage system may be considered to be an unavailability condition for the entire server block data storage system (e.g., in embodiments in which a server block data storage system maintains multiple local hard disks, failure of or problems with any of the local hard disks may be considered to be an unavailability condition for the entire server block data storage system), while in other embodiments a server block data storage system will not be considered to be unavailable as long as it is able to respond to data access requests.

Furthermore, in addition to moving one or more volumes from an existing server block data storage system when that server block data storage system becomes unavailable, the BDS System Manager may in some embodiments decide to move one or more volumes from an existing server block data storage system to a different server block data storage system and/or decide to create a new copy of one or more volumes at various other times and for various other reasons. Such a movement of or creation of a new copy of a volume may be performed in a manner similar to that discussed in greater detail elsewhere (e.g., by replicating the primary copy of the volume to create a new copy, and by optionally removing the prior copy of the volume in at least some situations, such as when the volume copy is being moved). Situations that may prompt a volume move or new volume copy creation include, for example, the following non-exclusive list: a particular server block data storage system may become over-utilized (e.g., based on usage of CPU, network bandwidth, I/O access, storage capacity, etc.), such as to trigger movement of one or more volumes from that server block data storage system; a particular server block data storage system may lack sufficient resources for a desired modification of an existing volume (e.g., may lack sufficient available storage space if the size of an existing volume is requested to be expanded), such as to trigger movement of one or more volumes from that server block data storage system; a particular server block data storage system may need maintenance or upgrades that will cause it to be unavailable for a period of time, such as to trigger temporary or permanent movement of one or more volumes from that server block data storage system; based on recognition that usage patterns for a particular volume or other characteristics of a volume may be better accommodated on other server block data storage systems, such as another server block data storage system with additional capabilities (e.g., for volumes that have frequent data modifications, to use a primary server block data storage system with higher-than-average disk write capabilities, and/or for volumes that are very large in size, to use a primary server block data storage system with higher-than-average storage capacity); in response to a request from a user who created or is otherwise associated with a volume (e.g., in response to the user purchasing premium access to a server block data storage system having enhanced capabilities); to provide at least one new copy of a volume in a different geographical location (e.g., another data center) at which programs execute, such as to trigger movement of and/or copying of the volume from a server block data storage system at a first geographical location when use of a volume by an executing program at another geographical location is requested; etc.

In addition, after a volume has been moved or a new copy created, the BDS System Manager may in some embodiments and situations update one or more node managers as appropriate (e.g., only node managers for executing programs currently using the volume, all node managers, etc.). In other embodiments, various information about volumes may be maintained in other manners, such as by having one or more copies of a volume information database that is network-accessible to node managers and/or the BDS System Manager. A non-exclusive list of types of information about volumes that may be maintained includes the following: an identifier for a volume, such as an identifier that is unique for the server block data storage systems that store copies of the volume or that is globally unique for the block data storage service; restricted access information for a volume, such as passwords or encryption keys, or lists or other indications of authorized users for the volume; information about the primary server block data storage system for the volume, such as a network address and/or other access information; information about one or more mirror server block data storage systems for the volume, such as information about an ordering that indicates which mirror server block data storage system will be promoted to be the primary system if the existing primary server storage system becomes unavailable, a network address and/or other access information, etc.; information about any snapshot volume copies that have been created for the volume, as described in greater detail below; information about whether the volume is to be available to users other than the creator of the volume, and if so under what circumstances (e.g., for read access only, for other users to make their own volumes that are copies of this volume, pricing information for other users to receive various types of access to the volume); etc.

In addition to maintaining reliable and available access of executing programs to block data storage volumes by moving or otherwise replicating volume copies when server block data storage systems become unavailable, the block data storage service may perform other actions in other situations to maintain access of executing programs to block data storage volumes. For example, if a first executing program unexpectedly becomes unavailable, in some embodiments the block data storage service and/or program execution service may take actions to have a different second executing program (e.g., a second copy of the same program that is executing on a different host computing system) attach to some or all block data storage volumes that were in use by the unavailable first program, so that the second program can quickly take over at least some operations of the unavailable first program. The second program may in some situations be a new program whose execution is initiated by the unavailability of the existing first program, while in other situations the second program may already be executing (e.g., if multiple program copies are concurrently executed to share an overall load of work, such as multiple Web server programs that receive different incoming client requests as mediated by a load balancer, with one of the multiple program copies being selected to be the second program; if the second program is a standby copy of the program that is executing to allow a "hot" swap from the existing first program in the event of unavailability, such as without the standby program copy being actively used until the unavailability of the existing first program occurs; etc.). In addition, in some embodiments, a second program to which an existing volume's attachment and ongoing use is switched may be on another host physical computing system in the same geographical location (e.g., the same data center) as the first program, while in other embodiments the second program may be at a different geographical location (e.g., a different data center, such as in conjunction with a copy of the volume that was previously or concurrently moved to that other data center and will be used by that second program). Furthermore, in some embodiments, other related actions may be taken to further facilitate the switch to the second program, such as by redirecting some communications intended for the unavailable first program to the second program.

In addition, in at least some embodiments, other techniques may be used to provide reliable and available access to block data storage volumes, as well as other benefits, such as to allow a copy of an indicated volume to be saved to one or more remote archival storage systems (e.g., at a second geographical location that is remote from a first geographical location at which the server block data storage systems store the active primary and mirror copies of the volume and/or that is remote from the host physical computing systems that execute the programs that use the volume), such as for long-term backups and/or other purposes. For example, in some embodiments, the archival storage systems may be provided by a remote network-accessible storage service. In addition, the copies of a volume that are saved to the archival storage systems may in at least some situations be snapshot copies of the volume at a particular point in time, but which are not automatically updated as ongoing use of the volume causes its stored block data contents to change, and/or which are not available to be attached to and used by executing programs in the same manner as volumes. Thus, as one example, a long-term snapshot copy of a volume may be used, for example, as a backup copy of a volume, and may further in some embodiments serve as the basis of one or more new volumes that are created from the snapshot copy (e.g., such that the new volumes begin with the same block storage contents as the snapshot copy).

In addition, the snapshot copies of a volume at the archival storage systems may be stored in various manners, such as to represent smaller chunks of a volume (e.g., if the archival storage systems store data as smaller objects rather than a large linear sequential block of data). For example, a volume may be represented as a series of multiple smaller chunks (with a volume having a size of, for example, one gigabyte or one terabyte, and with a chunk having a size that is, for example, a few megabytes), and information about some or all chunks (e.g., each chunk that is modified) may be stored separately on the archival storage systems, such as by treating each chunk as a distinct stored object. Furthermore, in at least some embodiments, a second and later snapshot copy of a particular volume may be created in such a manner as to store only incremental changes from a prior snapshot copy of the volume, such as by including stored copies of new storage chunks that have been created or modified since the prior snapshot copy, but sharing stored copies of some previously existing chunks with the prior snapshot copy if those chunks have not changed. In such embodiments, if a prior snapshot copy is later deleted, the previously existing chunks stored by that prior snapshot copy that are shared by any later snapshot copies may be retained for use by those later snapshot copies, while non-shared previously existing chunks stored by that prior snapshot copy may be deleted.

In addition, in at least some embodiments, when creating a snapshot copy of a volume at a point in time, access to the primary volume copy by executing programs may be allowed to continue, including allowing modifications to the data stored in the primary volume copy, but without any such ongoing data modifications being reflected in the snapshot copy, such as if the snapshot copy is based on volume chunks stored on the archival storage systems that are not updated once the snapshot copy creation begins until the snapshot copy creation is completed. For example, in at least some embodiments, copy-on-write techniques are used when creation of a snapshot copy of a volume is initiated and a chunk of the volume is subsequently modified, such as to initially maintain stored copies of both the unmodified chunk and the modified chunk on the primary server block data storage system that stores the primary volume copy (and optionally as well on the mirror server block data storage systems that store one or more of the mirror copies of the volume). When confirmation is received that the archival storage systems have successfully stored the snapshot copy of the volume (including a copy of the unmodified chunk), the unmodified chunk copy on the primary server block data storage system (and optionally on the mirror server block data storage systems) may then be deleted.

Moreover, such volume chunks or other volume data stored on the archival storage systems may be used in other manners in at least some embodiments, such as to use the archival storage systems as a backing store for the primary and/or mirror copies of some or all volumes. For example, volume data stored on the archival storage systems may be used to assist in maintaining consistency between multiple copies of a volume on multiple server block data storage systems in at least some situations. As one example, one or more mirror copies of a volume may be created or updated based at least in part on volume chunks stored on the archival storage systems, such as to minimize or eliminate a need to access the primary volume copy to obtain at least some of the volume chunks. For example, if the primary volume copy is updated more quickly or more reliably than modified chunks on the archival storage systems, a new mirror volume copy may be created by using at least some volume chunks stored on the archival storage systems that are known to be accurate (e.g., from a recent snapshot volume copy), and by accessing the primary volume copy only to obtain portions of the volume that correspond to chunks that may have been modified subsequent to creation of the snapshot volume copy. Similarly, if the modified chunks on the archival storage systems reliably reflect a current state of a primary volume copy, a mirror volume copy may be updated using those modified chunks rather than via interactions by or with the primary volume copy.

In addition, in some embodiments, the amount of data that is stored in a mirror volume copy (and the resulting size of the mirror volume copy) may be much less than that of the primary copy of the volume, such as if volume information on the archival storage systems is used in place of at least some data that would otherwise be stored in such a minimal mirror volume copy. As one example, once a snapshot copy of a volume is created on one or more archival storage systems, a minimal mirror copy of a volume need not in such embodiments store any of the volume data that is present in the snapshot volume copy. As modifications are made to the primary volume copy after the snapshot copy creation, some or all of those data modifications may also be made to the minimal mirror volume copy (e.g., all of the data modifications, only the data modifications that are not reflected in modified volume chunks stored on the archival storage systems, etc.)—then, if access to the minimal mirror volume copy is later needed, such as if the minimal mirror volume copy is promoted to be the primary volume copy, the other data that is missing from the minimal mirror volume copy (e.g., the non-modified portions of the volume) may be restored by retrieving it from the archival storage systems (e.g., from the prior snapshot volume copy). In this manner, volume reliability may be enhanced, while also minimizing the amount of storage space used on the server block data storage systems for the mirror volume copies.

In yet other embodiments, the definitive or master copy of a volume may be maintained on the archival storage systems, and the primary and mirror copies of the volume may reflect a cache or other subset of the volume (e.g., a subset that has been recently accessed and/or that is expected to be accessed soon)—in such embodiments, the non-local block data storage volume of the block data storage service may be used to provide a more proximate source of volume data for access by executing programs than the remote archival storage systems. In addition, in at least some such embodiments, a volume may be described to users as being of a particular size that corresponds to the master copy maintained on the archival storage systems, but with the primary and mirror copies being a smaller size. Furthermore, in at least some such embodiments, lazy updating techniques may be used to immediately update a copy of data in a first data store (e.g., a primary volume copy on a server block data storage system) but to update the copy of that same data in a distinct second data store (e.g., the archival storage systems) later, such as in a manner to maintain strict data consistency at the second data store by ensuring that write operations or other data modifications to a portion of a volume are updated at the second data store before performing any subsequent read operation or other access of that portion of the volume from the second data store (e.g., by using write-back cache updating techniques). Such lazy updating techniques may be used, for example, when updating modified chunks of a volume on archival storage systems, or when updating a mirror volume copy from modified chunks of the volume that are stored on archival storage systems. In other embodiments, other techniques may be used when updating modified chunks of a volume on archival storage systems, such as to use write-through cache techniques to immediately update the copy of data in the second data store (e.g., on the archival storage systems) when the copy of the data in the first data store is modified.

Such snapshot volume copies stored on archival storage systems provide various other benefits as well. For example, if all primary and mirror copies of a volume are stored on multiple server block data storage systems at a single geographical location (e.g., a data center), and the computing and storage systems at that geographical location become unavailable (e.g., electricity is lost to an entire data center), the existence of a recent snapshot copy of the volume at a different remote storage location may ensure that a recent version of the volume is available when the computing and storage systems at the geographical location later become available again (e.g., when electricity is restored), such as if data from one or more server storage systems at the geographical location is lost. Furthermore, in such a situation, one or more new copies of the volume may be created at one or more new geographical locations based on a recent long-term snapshot copy of the volume from the remote archival storage systems, such as to allow one or more executing program copies outside an unavailable geographical location to access and use those new volume copies. Additional details related to archival storage systems and their use are included below.

As previously noted, in at least some embodiments, some or all block data storage volumes each have copies stored on two or more distinct server block data storage systems at a single geographical location, such as within the same data center in which executing programs will access the volume—by locating all of the volume copies and executing programs at the same data center or other geographical location, various desired data access characteristics may be maintained (e.g., based on one or more internal networks at that data center or other geographical location), such as latency and throughput. For example, in at least some embodiments, the described techniques may provide access to non-local block data storage that has access characteristics that are similar to or better than access characteristics of local physical block data storage devices, but with much greater reliability that is similar to or exceeds reliability characteristics of RAID ("Redundant Array of Independent/Inexpensive Disks") systems and/or dedicated SANs ("Storage Area Networks") and at much lower cost. In other embodiments, the primary and mirror copies for at least some volumes may instead be stored in other manners, such as at different geographical locations (e.g., different data centers), such as to further maintain availability of a volume even if an entire data center becomes unavailable. In embodiments in which volume copies may be stored at different geographical locations, a user may in some situations request that a particular program be executed proximate to a particular volume (e.g., at the same data center at which the primary volume copy is located), or that a particular volume be located proximate to a particular executing program, such as to provide relatively high network bandwidth and low latency for communications between the executing program and primary volume copy.

Furthermore, access to some or all of the described techniques may in some embodiments be provided in a fee-based or other paid manner to at least some users. For example, users may pay one-time fees, periodic (e.g., monthly) fees and/or one or more types of usage-based fees to use the block data storage service to store and access volumes, to use the program execution service to execute programs, and/or to use archival storage systems (e.g., provided by a remote long-term storage service) to store long-term backups or other snapshot copies of volumes. Fees may be based on one or more factors and activities, such as indicated in the following non-exclusive list: based on the size of a volume, such as to create the volume (e.g., as a one-time fee), to have ongoing storage and/or use of the volume (e.g., a monthly fee), etc.; based on non-size characteristics of a volume, such as a number of mirror copies, characteristics of server block data storage systems (e.g., data access rates, storage sizes, etc.) on which the primary and/or mirror volume copies are stored, and/or a manner in which the volume is created (e.g., a new volume that is empty, a new volume that is a copy of an existing volume, a new volume that is a copy of a snapshot volume copy, etc.); based on the size of a snapshot volume copy, such as to create the snapshot volume copy (e.g., as a one-time fee) and/or have ongoing storage of the volume (e.g., a monthly fee); based on the non-size characteristics of one or more snapshot volume copies, such as a number of snapshots of a single volume, whether a snapshot copy is incremental with respect to one or more prior snapshot copies, etc.; based on usage of a volume, such as the amount of data transferred to and/or from a volume (e.g., to reflect an amount of network bandwidth used), a number of data access requests sent to a volume, a number of executing programs that attach to and use a volume (whether sequentially or concurrently), etc.; based on the amount of data transferred to and/or from a snapshot, such as in a manner similar to that for volumes; etc. In addition, the provided access may have various forms in various embodiments, such as a one-time purchase fee, an ongoing rental fee, and/or based on another ongoing subscription basis. Furthermore, in at least some embodiments and situations, a first group of one or more users may provide data to other users on a fee-based basis, such as to charge the other users for receiving access to current volumes and/or historical snapshot volume copies created by one or more users of the first group (e.g., by allowing them to make new volumes that are copies of volumes and/or of snapshot volume copies; by allowing them to use one or more created volumes; etc.), whether as a one-time purchase fee, an ongoing rental fee, or on another ongoing subscription basis.

In some embodiments, one or more APIs ("application programming interfaces") may be provided by the block data storage service, program execution service and/or remote long-term storage service, such as to allow other programs to programmatically initiate various types of operations to be performed (e.g., as directed by users of the other programs). Such operations may allow some or all of the previously described types of functionality to be invoked, and include, but are not limited to, the following types of operations: to create, delete, attach, detach, or describe volumes; to create, delete, copy or describe snapshots; to specify access rights or other metadata for volumes and/or snapshots; to manage execution of programs; to provide payment to obtain other types of functionality; to obtain reports and other information about use of capabilities of one or more of the services and/or about fees paid or owed for such use; etc. The operations provided by the API may be invoked by, for example, executing programs on host computing systems of the program execution service and/or by computing systems of customers or other users that are external to the one or more geographical locations used by the block data storage service and/or program execution service.

For illustrative purposes, some embodiments are described below in which specific types of block data storage is provided in specific ways to specific types of programs executing on specific types of computing systems. These examples are provided for illustrative purposes and are simplified for the sake of brevity, and the inventive techniques can be used in a wide variety of other situations, some of which are discussed below, and the techniques are not limited to use with virtual machines, data centers or other specific types of data storage systems, computing systems or computing system arrangements. In addition, while some embodiments are discussed as providing and using reliable non-local block data storage, in other embodiments types of data storage other than block data storage may similarly be provided.

FIG. 1 is a network diagram illustrating an example embodiment in which multiple computing systems execute programs and access reliable non-local block data storage, such as under the control of a block data storage service and/or program execution service. In particular, in this example, a program execution service manages the execution of programs on various host computing systems located within a data center 100, and a block data storage service uses multiple other server block data storage systems at the data center to provide reliable non-local block data storage to those executing programs. Multiple remote archival storage systems external to the data center may also be used to store additional copies of at least some portions of at least some block data storage volumes.

In this example, data center 100 includes a number of racks 105, and each rack includes a number of host computing systems, as well as an optional rack support computing system 122 in this example embodiment. The host computing systems 110a-c on the illustrated rack 105 each host one or more virtual machines 120 in this example, as well as a distinct Node Manager module 115 associated with the virtual machines on that host computing system to manage those virtual machines. One or more other host computing systems 135 also each host one or more virtual machines 120 in this example. Each virtual machine 120 may act as an independent computing node for executing one or more program copies (not shown) for a user (not shown), such as a customer of the program execution service. In addition, this example data center 100 further includes additional host computing systems 130a-b that do not include distinct virtual machines, but may nonetheless each act as a computing node for one or more programs (not shown) being executed for a user. In this example, a Node Manager module 125 executing on a computing system (not shown) distinct from the host computing systems 130a-b and 135 is associated with those host computing systems to manage the computing nodes provided by those host computing systems, such as in a manner similar to the Node Manager modules 115 for host computing systems 110. The rack support computing system 122 may provide various utility services for other computing systems local to its rack 105 (e.g., long-term program storage, metering and other monitoring of program execution and/or of non-local block data storage access performed by other computing systems local to the rack, etc.), as well as possibly to other computing systems located in the data center. Each computing system 110, 130 and 135 may also have one or more local attached storage devices (not shown), such as to store local copies of programs and/or data created by or otherwise used by the executing programs, as well as various other components.

In this example, an optional computing system 140 is also illustrated that executes a PES System Manager module for the program execution service to assist in managing the execution of programs on the computing nodes provided by the host computing systems located within the data center (or optionally on computing systems located in one or more other data centers 160, or other remote computing systems 180 external to the data center). As discussed in greater detail elsewhere, a PES System Manager module may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc. In some embodiments, the PES System Manager module may coordinate with the Node Manager modules 115 and 125 to manage program execution on computing nodes associated with the Node Manager modules, while in other embodiments the Node Manager modules 115 and 125 may not assist in managing such execution of programs.

This example data center 100 also includes a computing system 175 that executes a Block Data Storage ("BDS") System Manager module for the block data storage service to assist in managing the availability of non-local block data storage to programs executing on computing nodes provided by the host computing systems located within the data center (or optionally on computing systems located in one or more other data centers 160, or other remote computing systems 180 external to the data center). In particular, in this example, the data center 100 includes a pool of multiple server block data storage systems 165, which each have local block storage for use in storing one or more volume copies 155. Access to the volume copies 155 is provided over the internal network(s) 185 to programs executing on computing nodes 120 and 130. As discussed in greater detail elsewhere, a BDS System Manager module may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the BDS System Manager module may coordinate with the Node Manager modules 115 and 125 to manage use of volumes by programs executing on associated computing nodes, while in other embodiments the Node Manager modules 115 and 125 may not be used to manage such volume use. In addition, in other embodiments, one or more BDS System Manager modules may be structured in other manners, such as to have multiple instances of the BDS System Manager executing in a single data center (e.g., to share the management of non-local block data storage by programs executing on the computing nodes provided by the host computing systems located within the data center), and/or such as to have at least some of the functionality of a BDS System Manager module being provided in a distributed manner by software executing on some or all of the server block data storage systems 165 (e.g., in a peer-to-peer manner, without any separate centralized BDS System Manager module on a computing system 175).

In this example, the various host computing systems 110, 130 and 135, server block data storage systems 165, and computing systems 125, 140 and 175 are interconnected via one or more internal networks 185 of the data center, which may include various networking devices (e.g., routers, switches, gateways, etc.) that are not shown. In addition, the internal networks 185 are connected to an external network 170 (e.g., the Internet or other public network) in this example, and the data center 100 may further include one or more optional devices (not shown) at the interconnect between the data center 100 and an external network 170 (e.g., network proxies, load balancers, network address translation devices, etc.). In this example, the data center 100 is connected via the external network 170 to one or more other data centers 160 that each may include some or all of the computing systems and storage systems illustrated with respect to data center 100, as well as other remote computing systems 180 external to the data center. The other computing systems 180 may be operated by various parties for various purposes, such as by the operator of the data center 100 or third parties (e.g., customers of the program execution service and/or of the block data storage service). In addition, one or more of the other computing systems 180 may be archival storage systems (e.g., as part of a remote network-accessible storage service) with which the block data storage service may interact, such as under control of one or more archival manager modules (not shown) that execute on the one or more other computing systems 180 or instead on one or more computing systems of the data center 100, as described in greater detail elsewhere. Furthermore, while not illustrated here, in at least some embodiments, at least some of the server block data storage systems 165 may further be interconnected with one or more other networks or other connection mediums, such as a high-bandwidth connection over which the server storage systems 165 may share volume data (e.g., for purposes of replicating copies of volumes and/or maintaining consistency between primary and mirror copies of volumes), with such a high-bandwidth connection not being available to the various host computing systems 110, 130 and 135 in at least some such embodiments.

It will be appreciated that the example of FIG. 1 has been simplified for the purposes of explanation, and that the number and organization of host computing systems, server block data storage systems and other devices may be much larger than what is depicted in FIG. 1. For example, as one illustrative embodiment, there may be approximately 4000 computing systems per data center, with at least some of those computing systems being host computing systems that may each host 15 virtual machines, and/or with some of those computing systems being server block data storage systems that may each store several volume copies. If each hosted virtual machine executes one program, then such a data center may execute as many as sixty thousand program copies at one time. Furthermore, hundreds or thousands (or more) volumes may be stored on the server block data storage systems, depending on the number of server storage systems, size of the volumes, and number of mirror copies per volume. It will be appreciated that in other embodiments, other numbers of computing systems, programs and volumes may be used.

Figure 2C:
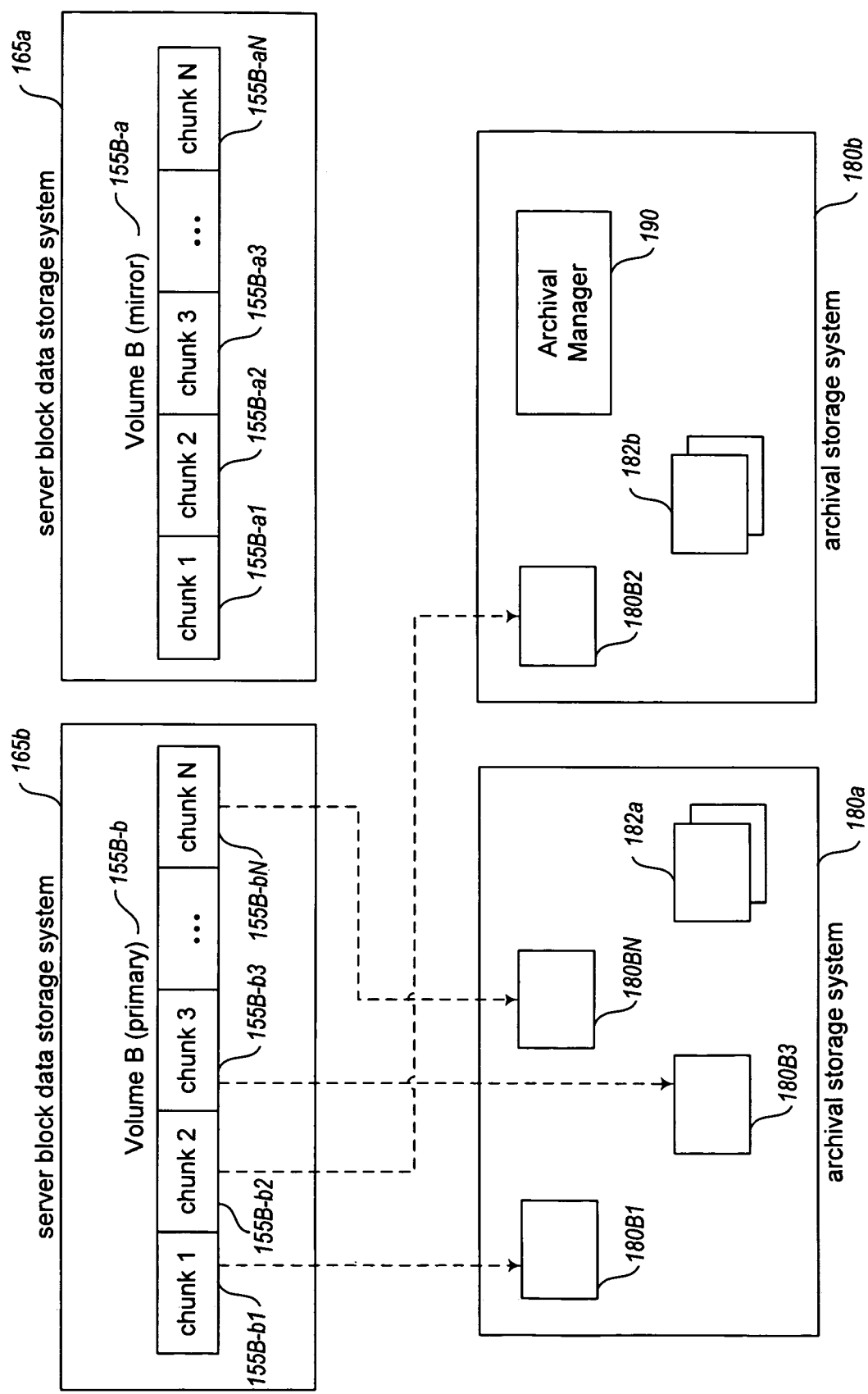

FIGS. 2A-2F illustrate examples of providing reliable non-local block data storage functionality to clients. In particular, FIGS. 2A and 2B illustrate examples of server block data storage computing systems that may be used to provide reliable non-local block data storage functionality to clients (e.g., executing programs), such as on behalf of a block data storage service, and FIGS. 2C-2F illustrate examples of using archival storage systems to store at least some portions of some block data storage volumes. In this example, FIG. 2A illustrates several server block data storage systems 165 that each store one or more volume copies 155, such as with each volume having a primary copy and at least one mirror copy. In other embodiments, other arrangements may be used, as discussed in greater detail elsewhere, such as by having multiple primary volume copies (e.g., with all of the primary volume copies being available for simultaneous read access by one or more programs) and/or by having multiple mirror volume copies. The example server block data storage systems 165 and volume copies 155 may, for example, correspond to a subset of the server block data storage systems 165 and volume copies 155 of FIG. 1.

In this example, the server storage system 165a stores at least three volume copies, including the primary copy 155A-a for volume A, a mirror copy 155B-a for volume B, and a mirror copy 155C-a for volume C. One or more other volume copies that are not illustrated in this example may further be stored by the server storage system 165a, as well as by the other server storage systems 165. Another example server block data storage system 165b stores the primary copy 155B-b for volume B in this example, as well as a mirror copy 155D-b for volume D. In addition, example server block data storage system 165n includes a mirror copy 155A-n of volume A and a primary copy 155D-n of volume D. Thus, if an executing program (not shown) is attached to and using volume A, the node manager for that executing program will be interacting with server block data storage system 165a to access the primary copy 155A-a for volume A, such as via server storage system software (not shown) that executes on the server block data storage system 165a. Similarly, for one or more executing programs (not shown) attached to and using volumes B and D, the node manager(s) for the executing program(s) will interact with server block data storage systems 165b and 165n, respectively, to access the primary copies 155B-b for volume B and 155D-n for volume D, respectively. In addition, other server block data storage systems may further be present (e.g., server block data storage systems 165c-165m and/or 165o and beyond), and may store the primary volume copy for volume C and/or other primary and mirror volume copies, but are not shown in this example. Thus, in this example, each server block data storage system may store more than one volume copy, and may store a combination of primary and mirror volume copies, although in other embodiments volumes may be stored in other manners.

FIG. 2B illustrates server block data storage systems 165 similar to those of FIG. 2A, but at a later point in time after server storage system 165*b* of FIG. 2A has failed or otherwise become unavailable. In response to the unavailability of server storage system 165*b*, and its stored primary copy of volume B and mirror copy of volume D, the stored volume copies of the server storage systems 165 of FIG. 2B have been modified to maintain availability of volumes B and D. In particular, due to the unavailability of the primary copy 155B-b of volume B, the prior mirror copy 155B-a of volume B on server storage system 165*a* has been promoted to be the new primary copy for volume B. Thus, if one or more programs were previously attached to or otherwise interacting with the prior primary copy 155B-b of volume B when it became unavailable, those programs may have been automatically transitioned (e.g., by node managers associated with those programs) to continue ongoing interactions with server block data storage system 165*a* to access the new primary copy 155B-a for volume B. In addition, a new mirror copy 155B-c for volume B has been created on server storage system 165*c*.

While the mirror copy 155A-n of volume A of server storage system 165*n* of FIG. 2A is not illustrated in FIG. 2B for the sake of brevity, it continues to be available on server storage system 165*n* along with the primary copy 155D-n of volume D, and thus any programs that were previously attached to or otherwise interacting with the primary copy 155D-n of volume D when server storage system 165*b* became unavailable will continue to interact with that same primary volume D copy 155D-n on server storage system on server storage system 165*n* without modification. However, due to the unavailability of the mirror copy 155D-b of volume D on unavailable server storage system 165*b*, at least one additional mirror copy of volume D has been created in FIG. 2B, such as volume D mirror copy 155D-o of server storage system 165*o*. In addition, FIG. 2B illustrates that at least some volumes may have multiple mirror copies, such as volume D that also includes a previously existing (but not shown in FIG. 2A) volume D mirror copy 155D-c on server storage system 165*c*.

FIGS. 2C-2F illustrate examples of using archival storage systems to store at least some portions of some block data storage volumes. In this example, FIG. 2C illustrates multiple server block data storage systems 165 that each store one or more volume copies 155, such as to correspond to the example server block data storage systems 165 illustrated in FIG. 2A at a time before server block data storage system 165*b* becomes unavailable. FIG. 2C further illustrates multiple archival storage systems 180, which may, for example, correspond to a subset of the computing systems 180 of FIG. 1. In particular, in this example, FIG. 2C illustrates server block data storage systems 165*a* and 165*b* of FIG. 2A, although in this example only the primary and mirror copies of volume B are illustrated for those server block data storage systems. As discussed with respect to FIG. 2A, the server storage system 165*b* stores the primary copy 155B-b of volume B, and server storage system 165*a* stores the mirror copy 155B-a of volume B.

In the example of FIG. 2C, a user associated with volume B has requested that a new initial snapshot copy of volume B be stored on remote archival storage systems, such as for long-term backup. Accordingly, volume B has been separated into multiple chunk portions that will each be stored separately by the archival storage systems, such as to correspond to a typical or maximum storage size for the archival storage systems, or instead in another manner as determined by the block data storage service. In this example, the primary copy 155B-b of volume B has been separated into N chunks 155B-b1 through 155B-bN, and the mirror copy 155B-a of volume B similarly stores the same data using chunks 155B-a1 through 155B-aN. Each of the N chunks of volume B is stored as a separate data object on one of two example archival storage systems 180*a* and 180*b*, and thus those multiple corresponding stored data objects in aggregate form the initial snapshot volume copy for volume B. In particular, chunk 1 155B-b1 of the primary volume B copy is stored as data object 180B1 on archival storage system 180*a*, chunk 2 155B-b2 is stored as data object 180B2 on archival storage system 180*b*, chunk 3 155B-b3 is stored as data object 180B3 on archival storage system 180*a*, and chunk N 155B-bN is stored as data object 180BN on archival storage system 180*a*. In this example, the separation of volume B into multiple chunks is performed by the block data storage service, such that individual chunks of volume B may be individually transferred to the archival storage systems, although in other embodiments the entire volume B may instead be sent to the archival storage systems, which may then separate the volume into multiple chunks or otherwise process the volume data if so desired.

In addition, in this example, the archival storage system 180*b* is an archival storage computing system that executes an Archival Manager module 190 to manage operations of the archival storage systems, such as to manage the storage and retrieval of data objects, to track which stored data objects correspond to which volumes, to separate transferred volume data into multiple data objects, to meter and otherwise track use of the archival storage systems, etc. The Archival Manager module 190 may, for example, maintain a variety of information about the various data objects that correspond to a particular volume, such as for each snapshot copy of the volume, as discussed in greater detail with respect to FIG. 2F, while in other embodiments such snapshot volume copy information may instead be maintained in other manners (e.g., by the server block data storage systems or other modules of the block data storage service). In other embodiments, only a single archival storage system may be used, or instead the data objects corresponding to chunks of volume B may be stored across many more archival storage systems (not shown). In addition, in other embodiments, each archival storage system may execute at least part of an archival manager module, such as for each archival storage system to have a distinct archival manager module, or for all of the archival storage systems to provide the functionality of the archival manager module in a distributed peer-to-peer manner. In other embodiments, one or more archival manager modules may instead execute on one or more computing systems that are local to the other block data storage service modules (e.g., on the same computing system or a proximate computing system to one that executes a BDS System Manager module), or the operations of the archival storage systems may instead be managed directly by one or more other modules of the block data storage service without using an archival manager module (e.g., by a BDS System Manager module).

Furthermore, in at least some embodiments, the archival storage systems may perform various operations to enhance reliability of stored data objects, such as to replicate some or all data objects on multiple archival storage systems. Thus, for example, the other data objects 182*b* of archival storage system 180*b* may include mirror copies of one or more of the data objects 180B1, 180B3, and 180BN of archival storage system 180*a*, and the other data objects 182*a* of archival storage system 180*a* may similarly store a mirror copy of data object 180B2 of archival storage system 180*b*. Furthermore, as discussed in greater detail elsewhere, in some embodiments at least some chunks of volume B may already be stored on the archival storage systems before the request to create the initial snapshot copy of volume B is received, such as if the data objects stored on the archival storage systems to represent the volume B chunks are used as a backing store or other remote long-term backup for volume B. If so, the snapshot copy on the archival storage systems may instead be created without transferring any additional volume data at that time, such as if the data objects on the archival storage systems represent a current state of the volume B chunks, while in other embodiments additional steps may be taken to ensure that the already stored data objects are up to date with respect to the volume B chunks.

Figure 2D:
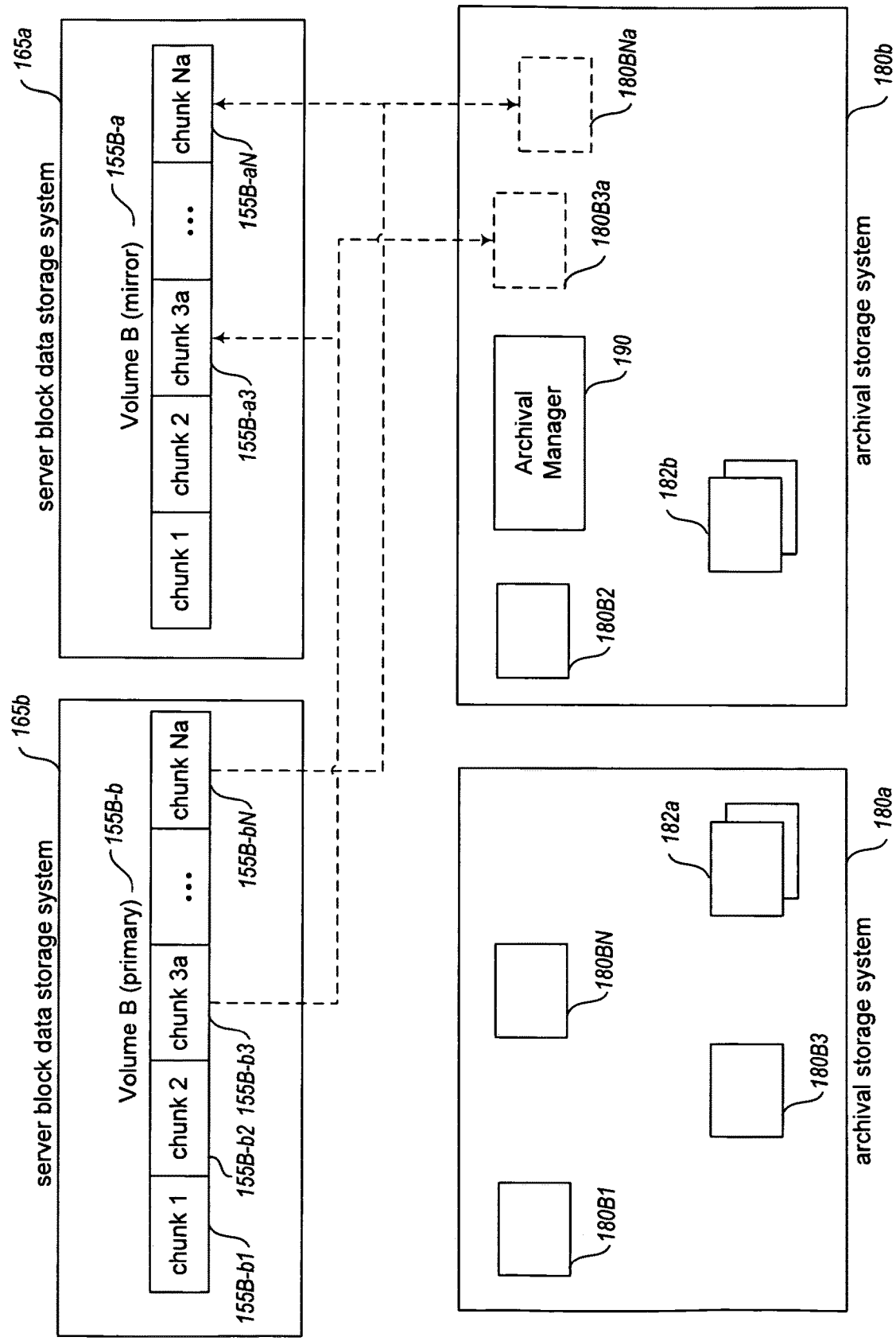

FIG. 2D continues the example of FIG. 2C, and reflects modifications to volume B that are performed after the initial snapshot copy is stored with respect to FIG. 2C. In particular, in this example, after the initial snapshot volume copy is created, volume B is modified, such as by one or more programs (not shown) that are attached to the volume. In this example, data is modified in at least two portions of volume B that correspond to chunk 3 155B-b3 and chunk N 155B-bN of the primary volume B copy, with the modified chunk data being illustrated as data 3*a* and Na, respectively. In this example, after the primary volume B copy 155B-b is modified, the server storage system 165*b* initiates corresponding updates of the mirror volume B copy 155B-a on server storage system 165*a*, such that chunk 3 155B-a3 of the mirror copy is modified to include the modified 3*a* data, and chunk N 155B-aN of the mirror copy is modified to include the modified Na data. Thus, the mirror volume B copy is maintained in the same state as that of the primary volume B copy in this example.

In addition, in some embodiments, data on the archival storage systems may be further modified to reflect the changes to volume B, even though those new volume B data modifications are not currently part of any snapshot volume copy for volume B. In particular, since the prior version of the chunk 3 and chunk N data is part of the initial snapshot volume copy stored on the archival storage systems, the corresponding data objects 180B3 and 180BN are not modified to reflect the changes to the volume B data that occurs subsequent to the initial snapshot volume copy creation. Instead, if copies are optionally made of the modified volume B data, they are instead stored in this example as additional data objects, such as optional data object 180B3*a* to correspond to the modified 3*a* data of chunk 3 155B-b3, and such as optional data object 180BNa to correspond to the modified Na data of chunk N 155B-bN. In this manner, the data for the initial snapshot volume copy is maintained even as changes are made to the primary and mirror copies of volume B. If the optional data objects 180B3*a* and 180BNa are created, that creation may be initiated in various ways, such as by the server block data storage system 165*b* in a similar manner to the updates that are initiated for the mirror volume B copy 155B-a.

Figure 2E:
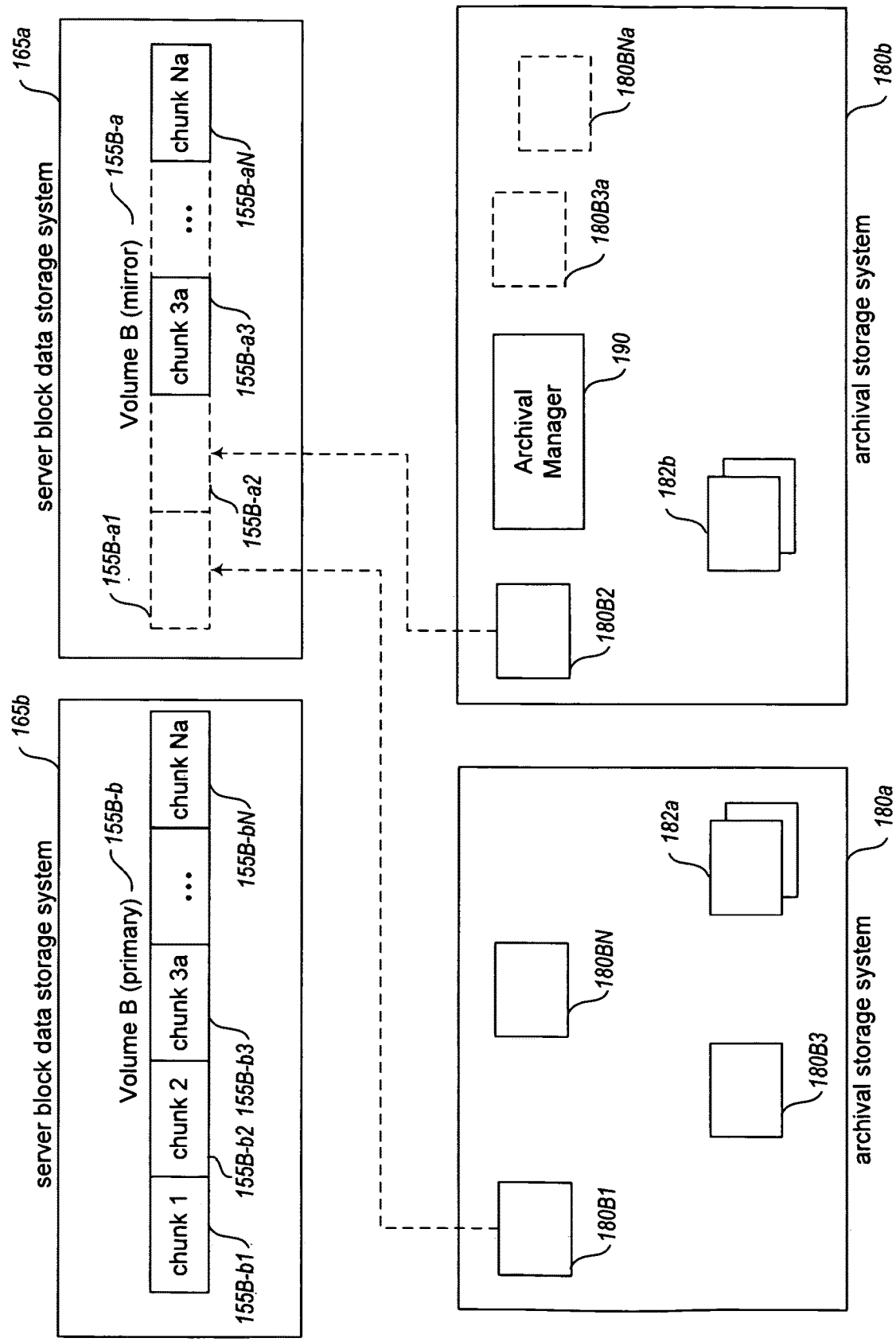

FIG. 2E illustrates an alternative embodiment with respect to the embodiment described previously with respect to FIG. 2D. In particular, in the example of FIG. 2E, volume B is again modified after the initial snapshot copy of the volume is stored on the archival storage systems in a manner similar to that discussed with respect to FIG. 2D, and accordingly the primary copy 155B-b of volume B on server storage system 165*b* is updated so that chunk 3 155B-b3 and chunk N 155B-bN are updated to include the modified data 3*a* and Na, respectively. However, in this embodiment, the mirror copy 155B-a of volume B on server storage system 165*a* is not maintained as a full copy of volume B. Instead, the snapshot volume copy of volume B on the archival storage systems is used in conjunction with the mirror copy 155B-a to maintain a copy of volume B. Thus, in this example, as modifications are made to the primary copy 155B-b of volume B after the creation of the initial snapshot volume copy, those modifications are also made for the mirror copy 155B-a on server storage system 165*a*, such that the mirror copy stores the modified 3*a* data for chunk 3 155B-a3 and the modified Na data for chunk N 155B-aN. However, the mirror copy of volume B does not initially store copies of the other chunks of volume B that have not been modified since the initial snapshot volume copy was created, since the snapshot volume copy of volume B on the archival storage systems includes copies of that data. Accordingly, if server storage system 165*b* later becomes unavailable, such as previously discussed with respect to FIG. 2B, the mirror copy 155B-a of volume B on server storage system 165*a* may be promoted to be the new primary copy of volume B. In order to accomplish this promotion in this example embodiment, the remaining portions of the mirror copy 155B-a of volume B are restored using the initial snapshot volume copy of volume B on the archival storage systems, such as to use the stored data object 180B1 to restore chunk 155B-a1, to use the stored data object 180B2 to restore the chunk 155B-a2, etc. Furthermore, in this example, the data objects 180B3*a* and 180BNa may similarly be optionally stored on the archival storage systems to represent the modified 3*a* and Na data. If so, in some embodiments, the modified 3*a* and Na data will also not be initially stored on the server block data storage system 165*a* for the mirror copy 155B-a, and instead the mirror copy chunks 155B-a3 and 155B-aN may similarly be restored from the archival storage system data objects 180B3*a* and 180BNa in a manner similar to that previously described for the other mirror copy chunks.

While the snapshot volume copy of volume B is used in the prior example to restore the mirror copy of volume B when the mirror copy is promoted to be the new primary volume copy, the snapshot volume copy on the archival storage systems may be used in other manners in other embodiments. For example, a new copy of volume B that matches the initial snapshot volume copy may be created using the snapshot volume copy on the archival storage systems in a manner similar to that previously described for restoring the mirror volume copy, such as to create a new mirror copy of volume B as of the time of the snapshot volume copy, to create an entirely new volume that is based on the snapshot volume copy of volume B, to assist in moving volume B from one server block storage system to another, etc. In addition, when the server block data storage systems of the block data service are available in multiple distinct data centers or other geographical locations, the remote archival storage systems may be available to all those server block data storage systems, and thus may be used to create a new volume copy based on a snapshot volume copy in any of those geographical locations.

Figure 2F:
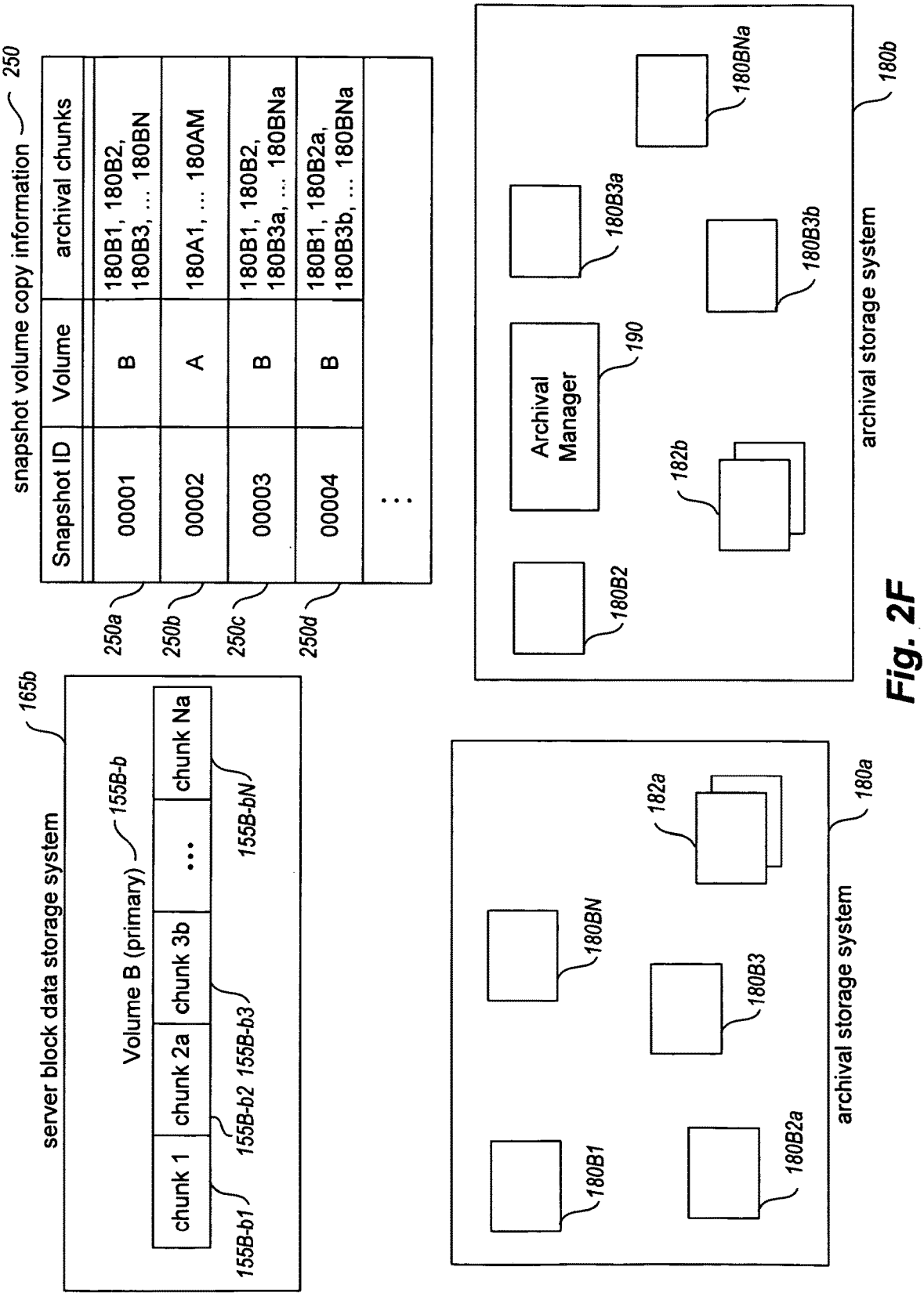

FIG. 2F continues the examples of FIGS. 2C and 2D, continuing at a later point in time after additional modifications are made to volume B. In particular, after the modifications to chunk 3 and chunk N are made as described with respect to FIG. 2C or 2D, a second snapshot volume copy of volume B is created on the archival storage systems. Subsequently, additional modifications are made to data in volume B that are stored in chunks 2 and 3. Accordingly, the primary copy of volume B 155B-b as illustrated in FIG. 2F includes original data 1 in chunk 1 155B-b1, data 2a in chunk 2 155B-b2 that is modified subsequent to creation of the second snapshot volume copy, data 3b in chunk 3 155B-b3 that is also modified subsequent to creation of the second snapshot volume copy, and data Na in chunk N 155B-bN that was modified after creation of the initial first snapshot volume copy but subsequent to creation of the second snapshot volume copy. Accordingly, after a third snapshot volume copy of volume B is indicated to be created, additional data objects are created in the archival storage systems to correspond to the two chunks modified since the creation of the second snapshot volume copy, with data object 180B2a corresponding to chunk 155B-b2 and including modified data 2a, and chunk 180B3b corresponding to chunk 1556-b3 and including modified data 3b.

In addition, in this example, the server block data storage system 165a is not shown, but a copy of information 250 maintained by the Archival Manager module 190 (e.g., stored on the archival storage system 180b or elsewhere) is shown to provide information about snapshot volume copies stored on the archival storage systems. In particular, in this example, the information 250 includes multiple rows 250a-250d, which each correspond to a distinct snapshot volume copy. Each of the rows of information in this example includes a unique identifier for the volume copy, an indication of the volume to which the snapshot volume copy corresponds, and an indication of an ordered list of the data objects stored on the archival storage systems that comprise the snapshot volume copy. Thus, for example, row 250a corresponds to the initial snapshot volume copy of volume B discussed with respect to FIG. 2C, and indicates that the initial snapshot volume copy includes stored data objects 180B1, 180B2, 180B3, and so on through 180BN. Row 250b corresponds to an example snapshot volume copy for a different volume A that includes various stored data objects that are not shown in this example. Row 250c corresponds to the second snapshot volume copy of volume B, and row 250d corresponds to the third snapshot volume copy of volume B. In this example, the second and third snapshot volume copies for volume B are incremental copies rather than full copies, such that chunks of volume B that have not changed since a prior snapshot volume copy will continue to be represented using the same stored data objects. Thus, for example, the second snapshot copy of volume B in row 250c indicates that the second snapshot volume copy shares data objects 180B1 and 180B2 with that of the initial snapshot volume copy of volume B (and possibly some or all of the data objects for chunks 4 through chunks N–1, not shown). Similarly, the third snapshot copy of volume B shown in row 250d also continues to use the same data object 180B1 as the initial and second snapshot volume copies.

By sharing common data objects between multiple snapshot volume copies, the amount of storage on the archival storage systems is minimized, since a new copy of an unchanging volume chunk such as chunk 1 does not have separate copies on the archival storage systems for each snapshot volume copy. In other embodiments however, some or all snapshot volume copies may not be incremental, instead each including a separate copy of each volume chunk regardless of whether the data in the chunk has changed. In addition, when incremental snapshot volume copies are used that may share one or more overlapping data objects with one or more other snapshot volume copies, the overlapping data objects are managed when additional types of operations are taken with respect to the snapshot volume copies. For example, if a request is subsequently received to delete the initial snapshot volume copy for volume B that is indicated in row 250a, and to accordingly free up storage space on the archival storage systems that is no longer needed, only some of the data objects indicated for that initial snapshot volume copy may be deleted on the archival storage systems. For example, chunk 3 and chunk N were modified after the initial snapshot volume copy was created, and thus the corresponding stored data objects 180B3 and 180BN for the initial snapshot volume copy are used only by that initial snapshot volume copy. Thus, those two data objects may be permanently deleted from the archival storage system 180a if the initial snapshot volume copy of volume B is deleted. However, the data objects 180B1 and 180B2 will be maintained even if that initial snapshot volume copy of volume B is deleted, since they continue to be a part of at least the second snapshot volume copy of volume B.

While not illustrated in this example, the information 250 may include a variety of other types of information about the snapshot volume copies, including information about which archival storage system stores each of the data objects, information about who is allowed to access the snapshot volume copy information and under what circumstances, etc. As one example, in some embodiments, some users may create snapshot volume copies and make access to those snapshot volume copies available to at least some other users in at least some circumstances, such as on a fee-based basis to allow the other users to create copies of one or more particular snapshot volume copies. If so, such access-related information may be stored in information 250 or elsewhere, and the archival manager module 190 may use such information to determine whether to satisfy requests made for information corresponding to particular snapshot volume copies. Alternatively, in other embodiments, the access to the snapshot volume copies may instead be managed by other modules of the block data storage service (e.g., a BBS System Manager module), such as to prevent requests from being sent to the archival storage systems unless those requests are authorized.

It will be appreciated that the examples of FIGS. 2A-2F have been simplified for the purposes of explanation, and that the number and organization of server block data storage systems, archival storage systems, and other devices may be much larger than what is depicted. Similarly, in other embodiments, primary volume copies, mirror volume copies, and/or snapshot volume copies may be stored and managed in other manners.

Figure 3:
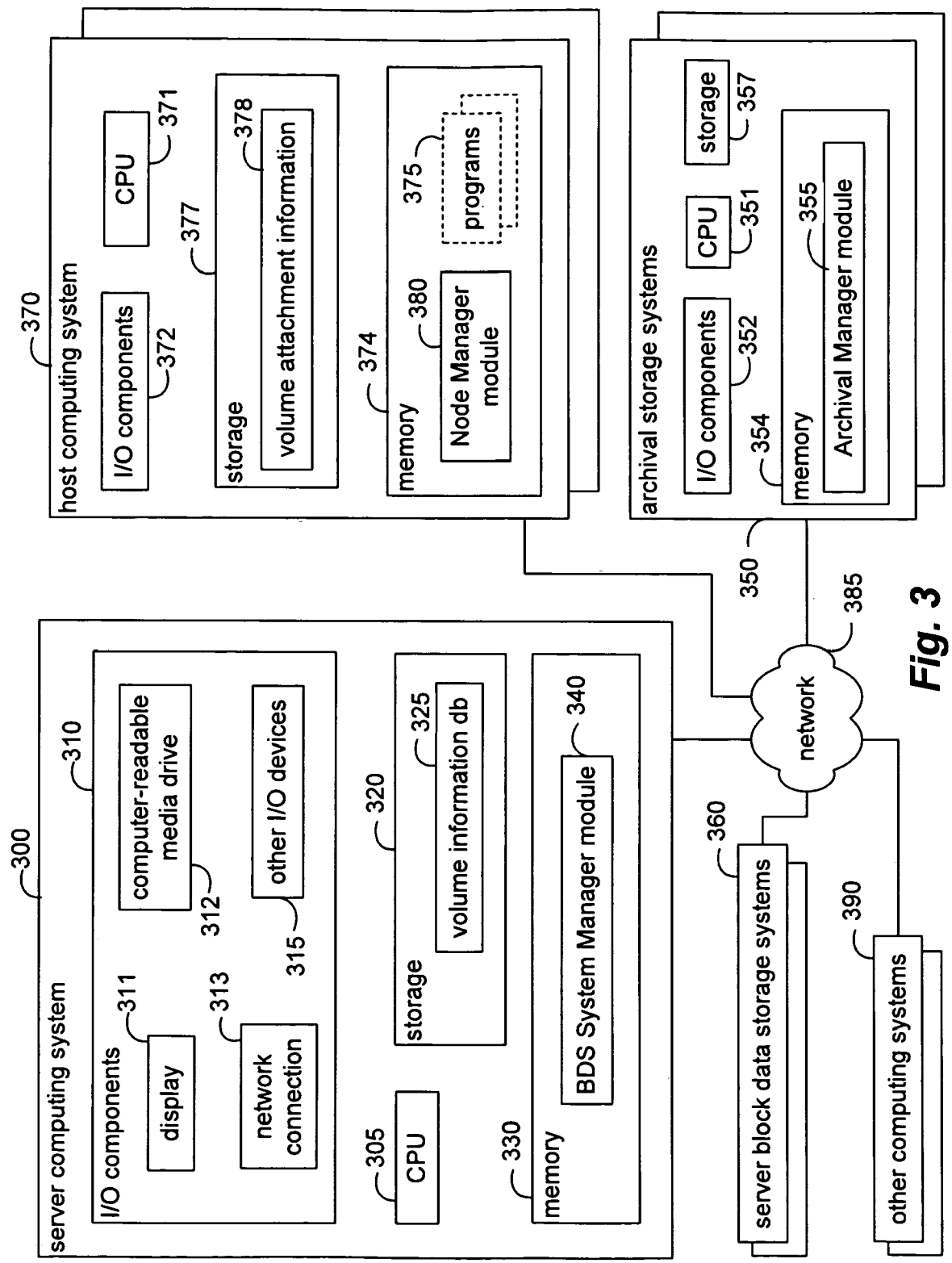
FIG. 3 is a block diagram illustrating example computing systems suitable for managing the provision to and use by clients of reliable non-local block data storage functionality.

FIG. 3 is a block diagram illustrating example computing systems suitable for managing the provision and use of reliable non-local block data storage functionality to clients. In this example, a server computing system 300 executes an embodiment of a BDS System Manager module 340 to manage provision of non-local block data storage functionality to programs executing on host computing systems 370 and/or on at least some other computing systems 390, such as to block data storage volumes (not shown) provided by the server block data storage systems 360. Each of the host computing systems 370 in this example also executes an embodiment of a Node Manager module 380 to manage access of programs 375 executing on the host computing system to at least some of the non-local block data storage volumes, such as in a coordinated manner with the BDS System Manager module 340 over a network 385 (e.g., an internal network of a data center, not shown, that includes the computing systems 300, 360, 370, and optionally at least some of the other computing systems 390). In other embodiments, some or all of the Node Manager modules 380 may instead manage one or more other computing systems (e.g., other computing systems 390).

In addition, multiple server block data storage systems 360 are illustrated that each store at least some of the non-local block data storage volumes (not shown) used by the executing programs 375, with access to those volumes also provided over the network 385 in this example. One or more of the server block data storage systems 360 may also each store a server software component (not shown) that manages operation of one or more of the server block data storage systems 360, as well as various information (not shown) about the data that is stored by the server block data storage systems 360. Thus, in at least some embodiments, the server computing system 300 of FIG. 3 may correspond to the computing system 175 of FIG. 1, one or more of the Node Manager modules 115 and 125 of FIG. 1 may correspond to the Node Manager modules 380 of FIG. 3, and/or one or more of the server block data storage computing systems 360 of FIG. 3 may correspond to server block data storage systems 165 of FIG. 1. In addition, in this example embodiment, multiple archival storage systems 350 are illustrated, which may store snapshot copies and/or other copies of at least portions of at least some block data storage volumes stored on the server block data storage systems 360. The archival storage systems 350 may also interact with some or all of the computing systems 300, 360, and 370, and in some embodiments may be remote archival storage systems (e.g., of a remote storage service, not shown) that interact with the computing systems 300, 360, and 370 over one or more other external networks (not shown).

The other computing systems 390 may further include other proximate or remote computing systems of various types in at least some embodiments, including computing systems via which customers or other users of the block data storage service interact with the computing systems 300 and/or 370. Furthermore, one or more of the other computing systems 390 may further execute a PES System Manager module to coordinate execution of programs on the host computing systems 370 and/or other host computing systems 390, or computing system 300 or one of the other illustrated computing systems may instead execute such a PES System Manager module, although a PES System Manager module is not illustrated in this example.

In this example embodiment, computing system 300 includes a CPU ("central processing unit") 305, local storage 320, memory 330, and various I/O ("input/output") components 310, with the illustrated I/O components in this example including a display 311, a network connection 312, a computer-readable media drive 313, and other I/O devices 315 (e.g., a keyboard, mouse, speakers, microphone, etc.). In the illustrated embodiment, the BDS System Manager module 340 is executing in memory 330, and one or more other programs (not shown) may also optionally be executing in memory 330.

Each computing system 370 similarly includes a CPU 371, local storage 377, memory 374, and various I/O components 372 (e.g., I/O components similar to I/O components 310 of server computing system 300). In the illustrated embodiment, a Node Manager module 380 is executing in memory 374 in order to manage one or more other programs 375 executing in memory 374 on the computing system, such as on behalf of customers of the program execution service and/or block data storage service. In some embodiments, some or all of the computing systems 370 may host multiple virtual machines, and if so, each of the executing programs 375 may be an entire virtual machine image (e.g., with an operating system and one or more application programs) executing on a distinct hosted virtual machine computing node. The Node Manager module 380 may similarly be executing on another hosted virtual machine, such as a privileged virtual machine monitor that manages the other hosted virtual machines. In other embodiments, the executing program copies 375 and the Node Manager module 380 may execute as distinct processes on a single operating system (not shown) executed on computing system 370.

Each archival storage system 350 in this example is a computing system that includes a CPU 351, local storage 357, memory 354, and various I/O components 352 (e.g., I/O components similar to I/O components 310 of server computing system 300). In the illustrated embodiment, an Archival Manager module 355 is executing in memory 354 in order to manage operation of one or more of the archival storage systems 350, such as on behalf of customers of the block data storage service and/or of a distinct storage service that provides the archival storage systems. In other embodiments, the Archival Manager module 355 may instead be executing on another computing system, such as one of the other computing systems 390 or on computing system 300 in conjunction with the BDS System Manager module 340. In addition, while not illustrated here, in some embodiments various information about the data that is stored by the archival storage systems 350 may be maintained on storage 357 or elsewhere, such as previously described with respect to FIG. 2F. Furthermore, while also not illustrated here, each of the server block data storage systems 360 and/or other computing systems 390 may similarly include some or all of the types of components illustrated with respect to the archival storage systems 350, such as a CPU, local storage, memory, and various I/O components.

The BDS System Manager module 340 and Node Manager modules 380 may take various actions to manage the provision and use of reliable non-local block data storage functionality to clients (e.g., executing programs), as described in greater detail elsewhere. In this example, the BDS System Manager module 340 may maintain a database 325 on storage 320 that includes information about volumes stored on the server block data storage systems 360 and/or on the archival storage systems 350 (e.g., for use in managing the volumes), and may further store various other information (not shown) about users or other aspects of the block data storage service. In other embodiments, information about volumes may be stored in other manners, such as in a distributed manner by Node Manager modules 380 on their computing systems and/or by other computing systems. In addition, in this example, each Node Manager module 380 on a host computing system 370 may store information 378 on local storage 377 about the current volumes attached to the host computing system and used by the executing programs 375 on the host computing system, such as to coordinate interactions with the server block data storage systems 360 that provide the primary copies of the volumes, and to determine how to switch to a mirror copy of a volume if the primary volume copy becomes unavailable. While not illustrated here, each host computing system may further include a distinct logical local block data storage device interface for each volume attached to the host computing system and used by a program executing on the computing system, which may further appear to the executing programs as being indistinguishable from one or more other local physically attached storage devices that provide local storage 377.

It will be appreciated that computing systems 300, 350, 360, 370 and 390 are merely illustrative and are not intended to limit the scope of the present invention. For example, computing systems 300, 350, 360, 370 and/or 390 may be connected to other devices that are not illustrated, including through network 385 and/or one or more other networks, such as the Internet or via the World Wide Web ("Web"). More generally, a computing node or other computing system or data storage system may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments, the functionality of some of the illustrated modules may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
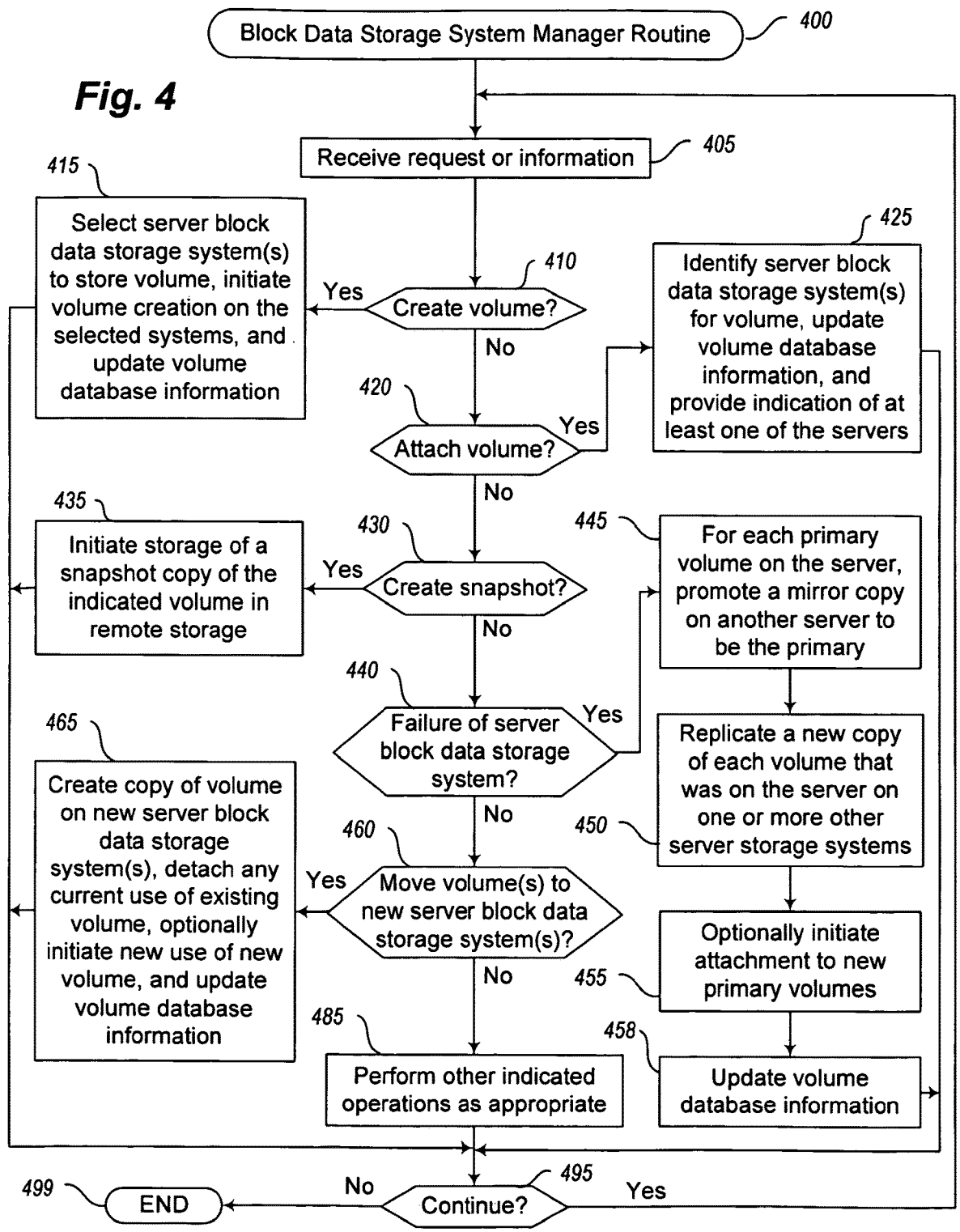
FIG. 4 illustrates a flow diagram of an example embodiment of a Block Data Storage System Manager routine.

FIG. 4 is a flow diagram of an example embodiment of a Block Data Storage System Manager routine 400. The routine may be provided by, for example, execution of the Block Data Storage System Manager module 175 of FIG. 1 and/or the BDS System Manager module 340 of FIG. 3, such as to provide a block data storage service for use by executing programs. In the illustrated embodiment, the routine may interact with multiple server block data storage systems at a single data center or other geographical location (e.g., if each such data center or other geographical location has a distinct embodiment of the routine executing at the geographical location), although in other embodiments a single routine 400 may support multiple distinct data centers or other geographical locations.

The illustrated embodiment of the routine begins at block 405, where a request or other information is received. The routine continues to block 410 to determine whether the received request was to create a new block data storage volume, such as from a user of the block data storage service and/or from an executing program that would like to access the new volume, and if so continues to block 415 to perform the volume creation. In the illustrated embodiment, the routine in block 415 selects one or more server block data storage system on which copies of the volume will be stored (e.g., based at least in part on location of and/or capabilities of the selected server storage systems), initializes the volume copies on those selected server storage systems, and updates stored information about volumes to reflect the new volume. For example, in some embodiments, the creation of a new volume may include initializing a specified size of linear storage on each of the selected servers in a specified manner, such as to be blank, to include a copy of another indicated volume (e.g., another volume at the same data center or other geographical location, or instead a volume stored at a remote location), to include a copy of an indicated snapshot volume copy (e.g., a snapshot volume copy stored by one or more archival storage systems, such as by interacting with the archival storage systems to obtain the snapshot volume copy), etc. In other embodiments, a logical block of linear storage of a specified size for a volume may be created on one or more server block data storage systems, such as by using multiple non-contiguous storage areas that are presented as a single logical block and/or by striping a logical block of linear storage across multiple local physical hard disks. To create a copy of a volume that already exists at another data center or other geographical location, the routine may, for example, coordinate with another instance of the routine 400 that supports block data storage service operations at that location. Furthermore, in some embodiments, at least some volumes will each have multiple copies that include at least one primary volume copy and one or more mirror copies on multiple distinct server storage systems, and if so multiple server storage systems may be selected and initialized.

If it is instead determined in block 410 that the received request is not to create a volume, the routine continues instead to block 420 to determine whether the received request is to attach an existing volume to an executing program copy, such as a request received from the executing program copy or from another computing system operated on behalf of a user associated with the executing program copy and/or the indicated volume. If so, the routine continues to block 425 to identify at least one of the server block data storage systems that stores a copy of the volume, and to associate at least one of the identified server storage systems with the executing program (e.g., to associate the primary server storage system for the volume with the computing node on which the program executes, such as by causing a logical local block storage device to be mounted on the computing node that represents the primary volume copy). The volume to be attached may be identified in various ways, such as by a unique identifier for the volume and/or an identifier for a user who created or is otherwise associated with the volume. After attaching the volume to the executing program copy, the routine may further update stored information about the volume to indicate the attachment of the executing program, such as if only a single program is allowed to be attached to the volume at a time, or if only a single program is allowed to have write access or other modification access to the volume at a time. In addition, in the indicated embodiment, information about at least one of the identified server storage systems may be provided to a node manager associated with the executing program, such as to facilitate the actual attachment of the volume to the executing program, although in other embodiments the node manager may have other access to such information.

If it is instead determined in block 420 that the received request is not to attach a volume to an executing program, the routine continues instead to block 430 to determine whether the received request is to create a snapshot copy for an indicated volume, such as a request received from an executing program that is attached to the volume or instead another computing system (e.g., a computing system operated by a user associated with the volume and/or a user who has purchased access to create a snapshot copy of another user's volume). In some embodiments, a snapshot volume copy may be created of a volume regardless of whether the volume is attached or in use by any executing programs, and/or regardless of whether the volume is stored at the same data center or other geographical location at which the routine 400 executes. If it is determined so, the routine continues to block 435 to initiate creation of a snapshot volume copy of the indicated volume, such as by interacting with one or more archival manager modules that coordinate operations of one or more archival storage systems (e.g., archival storage systems at a remote storage location, such as in conjunction with a remote long-term storage service that is accessible over one or more networks. In some embodiments, the snapshot volume copy creation may be performed by a third-party remote storage service in response to an instruction from the routine 400, such as if the remote storage service already stores at least some chunks of the volume. Furthermore, various other parameters may further be specified in at least some embodiments, such as whether the snapshot volume copy is to be incremental with respect to one or more other snapshot volume copies, etc.

If it is instead determined in block 430 that the received request is not to create a snapshot volume copy, the routine continues instead to block 440 to determine whether the information received in block 405 is an indication of failure or other unavailability of one or more server block data storage systems (or of one or more volumes, in other embodiments). For example, as described below with respect to block 485, the routine may in some embodiments monitor the status of some or all of the server block data storage systems and determine unavailability on that basis, such as by periodically or constantly sending ping messages or other messages to server block data storage systems to determine if a response is received, or by otherwise obtaining information about the status of the server storage systems. If it is determined in block 440 that the received information indicates the possible failure of one or more server storage systems, the routine continues to block 445 to take actions to maintain the availability of the one or more volumes stored on the indicated one or more server storage systems. In particular, the routine in block 445 determines whether any such volumes stored on the indicated one or more server storage systems are primary volume copies, and for each such primary volume copy, promotes one of the mirror copies for that volume on another server storage system to be the new primary copy for that volume. In block 450, the routine then causes at least one new copy of each volume to be replicated on one or more other server storage systems, such as by using an existing copy of the volume that is available on a server storage system other than one of those indicated to be unavailable. In other embodiments, the promotion of mirror copies to primary copies and/or the creation of new mirror copies may instead be performed in other manners, such as in a distributed manner by the server block data storage systems (e.g., using an election protocol between the mirror copies of a volume). In addition, in some embodiments the mirror volume copies may be minimal copies that include only portions of a primary copy of a volume (e.g., only portions that have been modified since a snapshot copy of the volume was previously created), and the promotion of a mirror copy to a primary copy may further include gathering information for the new primary copy to make it complete (e.g., from the most recent snapshot copy).

In block 455, the routine then optionally initiates attachments of one or more executing programs to any new primary volume copies that were promoted from mirror copies, such as for executing programs that were previously attached to primary volume copies on the one or more unavailable server storage systems, although in other embodiments such re-attachment to new primary volume copies will instead be performed in other manners (e.g., by a node manager associated with the executing program for which the re-attachment will occur). In block 458, the routine then updates information about the volumes on the unavailable server storage systems, such as to indicate the new volume copies created in block 450 and the new primary volume copies promoted in block 445. In other embodiments, new primary volume copies may be created in other manners, such as by creating a new volume copy as a primary volume copy, rather than promoting an existing mirror volume copy, although doing so may take longer than promoting an existing mirror volume copy. In addition, if no volume copies are available from which to replicate new volume copies in block 450, such as if multiple server storage systems that store the primary and mirror copies for a volume all fail substantially simultaneously, the routine may in some embodiments attempt to obtain information for the volume to use in such replication in other manners, such as from one or more recent snapshot volume copies for the volume that are available on archival storage systems, from a copy of the volume at another data center or other geographical location, etc.

If it is instead determined in block 440 that the received information is not an indication of failure or other unavailability of one or more server block data storage systems, the routine continues instead to block 460 to determine whether information received in block 405 indicates to move one or more volumes to one or more new server block data storage systems. Such volume movement may be performed for a variety of reasons, as discussed in greater detail elsewhere, including to other server block data storage systems at the same geographical location (e.g., to move existing volumes to storage systems that are better equipped to support the volumes) and/or to one or more server data storage systems at one or more other data centers or other geographical locations. In addition, movement of a volume may be initiated in various ways, such as due to a request from a user of the block data storage system that is associated with the volume, to a request from a human operator of the block data storage service, based on an automated detection of a better server storage system for a volume than the current server storage system being used (e.g., due to over-utilization of the current server storage system and/or under-utilization of the new server storage system), etc. If it is determined in block 460 that the received information is to move one or more such volume copies, the routine continues to block 465 and creates a copy of each indicated volume on one or more new server block data storage systems, such as in a manner similar to that previously discussed with respect to block 415 (e.g., by using an existing volume copy on a server block data storage system, by using a snapshot or other copy of the volume on one or more archival storage systems, etc.), and further updates stored information for the volume in block 465. In addition, in some embodiments the routine may take additional actions to support the movement, such as to delete the prior volume copy from a server block data storage system after the new volume copy is created. Furthermore, in situations in which one or more executing programs were attached to the prior volume copy being moved, the routine may initiate the detachment of the prior volume copy being moved for an executing program and/or may initiate a re-attachment of such an executing program to the new volume copy being created, such as by sending associated instructions to a node manager for the executing program, although in other embodiments the node manager may instead perform such actions.

If it is instead determined in block 460 that the received information is not an instruction to move one or more volumes, the routine continues instead to block 485 to perform one or more other indicated operations as appropriate. Other operations may have various forms in various embodiments, such as one or more of the following non-exclusive list: to perform monitoring of some or all server block data storage systems (e.g., by sending ping messages or other status messages to the server block data storage systems and waiting for a response); by initiating creation of a replacement primary volume copy and/or mirror volume copy in response to determining that a primary or mirror copy of a volume is unavailable, such as based on monitoring that is performed, on a message received from a primary server block data storage system that stores a primary copy of a volume but is unable to update one or more mirror copies of that volume, on a message received from a node manager module, etc.; detaching, deleting, and/or describing one or more volumes; deleting, describing and/or copying one or more snapshot volume copies; tracking use of volumes and/or snapshot volume copies by users, such as to meter such usage for payment purposes; etc. After blocks 415, 425, 435, 458, 465, or 485, the routine continues to block 495 to determine whether to continue, such as until an explicit termination instruction is received. If so, the routine returns to block 405, and if not the routine continues to block 499 and ends.

In addition, for at least some types of requests, the routine may in some embodiments further verify that the requester is authorized to make the request, such as based on access rights specified for the requester and/or an associated target of the request (e.g., an indicated volume). In some such embodiments, the verification of authorization may further include obtaining payment from the requester for the requested functionality (or verifying that any such payment has already been provided), such as to not perform the request if the payment is not provided. For example, types of request that may have associated payment in at least some embodiments and situations include requests to create a volume, attach a volume, create a snapshot copy, move an indicated volume (e.g., to a premium server storage system), and other types of indicated operations. Furthermore, some or all types of actions taken on behalf of users may be monitored and metered, such as for later use in determining corresponding usage-based fees for at least some of those actions.

Figure 5:
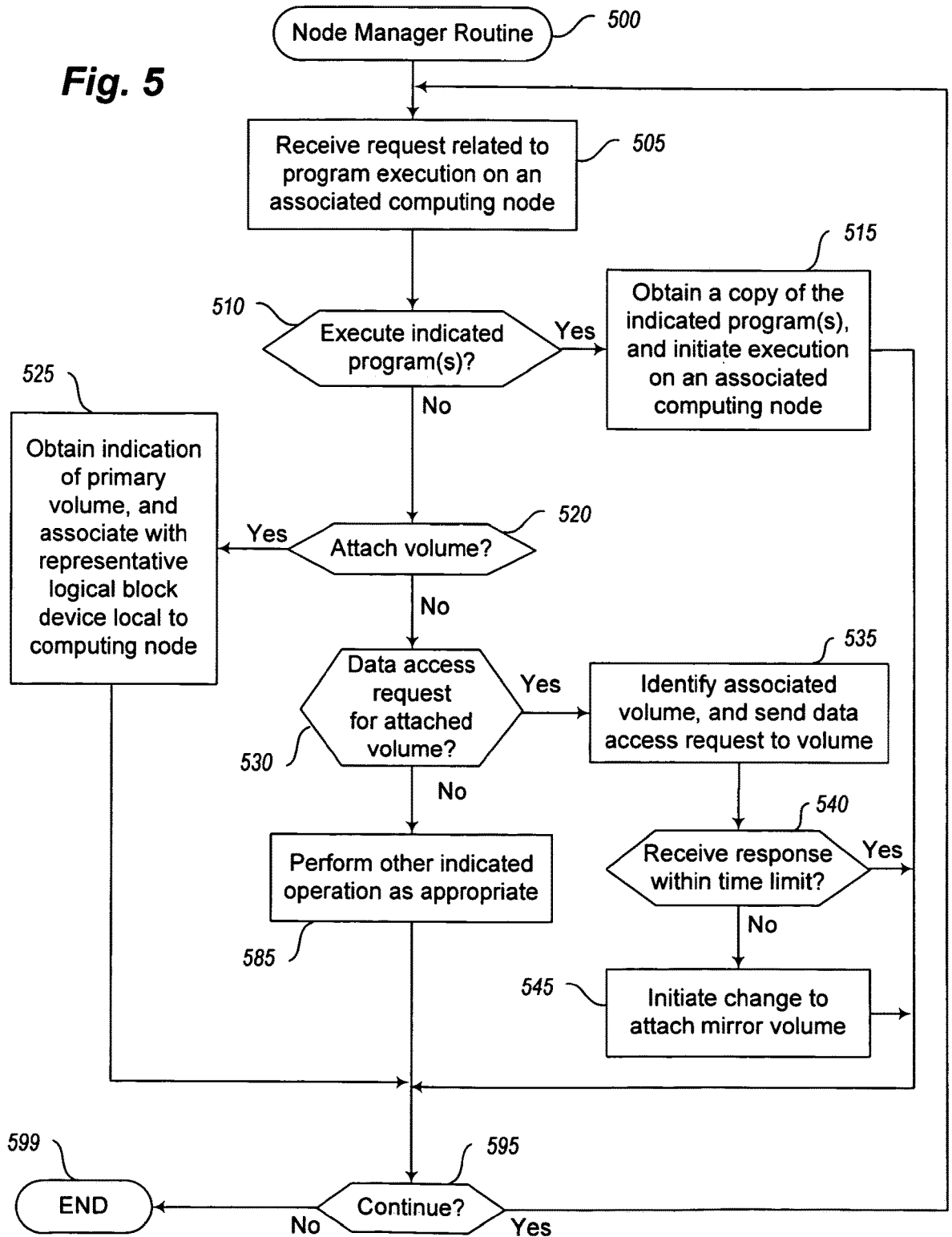
FIG. 5 illustrates a flow diagram of an example embodiment of a Node Manager routine.

FIG. 5 is a flow diagram of an example embodiment of a Node Manager routine 500. The routine may be provided by, for example, execution of a Node Manager module 115 and/or 125 of FIG. 1, and/or execution of a Node Manager module 380 of FIG. 3, such as to manage the use by one or more executing programs of non-local block data storage. In the illustrated embodiment, the block data storage service provides functionality through a combination of one or more BDS System Manager modules and multiple Node Manager modules and optionally one or more Archival Manager modules, although in other embodiments other configurations may be used (e.g., a single BDS System Manager module without any Node Manager modules and/or Archival Manager modules, multiple Node Manager modules executing together in a coordinated manager without a BDS System Manager module, etc.).

The illustrated embodiment of the routine begins in block 505, where a request is received related to program execution on an associated computing node. The routine continues to block 510 to determine whether the request is related to executing one or more indicated programs on an indicated associated computing node, such as a request from a program execution service and/or a user associated with those programs. If so, the routine continues to block 515 to obtain a copy of the indicated program(s) and to initiate execution of the program(s) on an associated computing node. In some embodiments, the one or more indicated programs may be obtained in block 515 based on the indicated programs being sent to the routine 500 as part of the request received in block 505, while in other embodiments the indicated programs may be retrieved from local or non-local storage (e.g., from a remote storage service). In other embodiments, the routine 500 may instead not perform operations related to executing programs, such as if another routine that supports the program execution service instead performs those operations on behalf of associated computing nodes.

If it is instead determined in block 510 that the received request is not to execute one or more indicated programs, the routine continues instead to block 520 to determine whether a request is received to attach an indicated volume to an indicated executing program, such as from the executing program, from the routine 400 of FIG. 4, and/or from a user associated with the indicated volume and/or the indicated executing program. If so, the routine continues to block 525 to obtain an indication of a primary copy of the volume, and to associate that primary volume copy with a representative logical local block data storage device for the computing node. In some embodiments, the representative local logical block data storage device may be indicated to the executing program and/or computing node by the routine 500, while in other embodiments, the executing program may instead initiate the creation of the local logical block data storage device. For example, in some embodiments the routine 500 may use GNBD ("Global Network Block Device") technology to make the logical local block data storage device available to a virtual machine computing node by importing a block device into a particular virtual machine and mounting that logical local block data storage device. In some embodiments, the routine may take further actions at block 525, such as to obtain and store indications of one or more mirror volume copies for the volume, such as to allow the routine to dynamically attach to a mirror volume copy if the primary volume copy later becomes unavailable.

If it is instead determined in block 520 that the received request of block 505 is not to attach an indicated volume, the routine continues instead to block 530 to determine whether the received request is a data access request by an executing program for an attached volume, such as a read request or a write request. If so, the routine continues to block 535, where the routine identifies the associated primary volume copy that corresponds to the data access request (e.g., based on the representative local logical block data storage device used by the executed program for the data access request), and initiates the requested data access to the primary volume copy. As discussed in greater detail elsewhere, in some embodiments a lazy write scheme may be used, such as by immediately modifying the actual primary and/or mirror volume copies to reflect a write data access request (e.g., to always update the mirror volume copy, to update a mirror volume copy only if the mirror volume copy is being promoted to be the primary volume copy, etc.), but not immediately modifying a corresponding chunk stored on one or more archival storage systems to reflect the write data access request (e.g., so as to eventually update the copy stored on the archival storage systems when sufficient modifications have been made and/or when read access to corresponding information is requested, etc.). In the illustrated embodiment, the maintaining of mirror volume copies is performed by a routine other than the routine 500 (e.g., by the primary server block data storage system that stores the primary volume copy), although in other embodiments the routine 500 may in block 535 further assist in maintaining one or more of the mirror volume copies by sending similar or identical data access requests to those mirror volume copies. Furthermore, in some embodiments a volume may not be stored on the archival storage systems until explicitly requested by a corresponding user (e.g., as part of a request to create a snapshot copy of the volume), while in other embodiments a copy may be maintained on the archival storage systems of at least some portions of at least some volumes (e.g., if the archival storage systems' copy is used as a backing store for the primary and/or mirror volume copies).

After block 535, the routine continues to block 540 to determine whether a response is received from the primary server block data storage system for the request sent in block 535 within a predefined time limit, such as to indicate success of the operation. If not, the routine determines that the primary server block data storage system is unavailable, and continues to block 545 to initiate a change to attach one of the mirror volume copies as the new primary volume copy, and to associate the server block data storage system for that mirror volume copy as the new primary server block data storage system for the volume. Furthermore, the routine similarly sends the data access request to the new primary volume copy in a manner similar to that indicated above with respect to block 535, and may further in some embodiments monitor whether an appropriate response is received and proceed to block 545 again if not (e.g., to promote another mirror volume copy and repeat the process). In some embodiments, the initiating of the change to a mirror volume copy as a new primary volume copy may be performed in coordination with routine 400, such as by initiating contact with routine 400 to determine which mirror volume copy should become the new primary volume copy, by receiving instructions from routine 400 when a mirror volume copy is promoted to be a primary volume copy by the routine 500 (e.g., as prompted by an indication sent by the routine 500 in block 545 that the primary volume copy is unavailable), etc.

If it is instead determined in block 530 that the received request is not a data access request for an attached volume, the routine continues instead to block 585 to perform one or more other indicated operations as appropriate. The other operations may have various forms in various embodiments, such as instructions from routine 400 of new volume information for one or more volumes (e.g., a new promoted primary volume copy for a volume to which one or more executing programs being managed are attached), to detach a volume from an executing program on a computing node associated with the routine 500, etc. In addition, in at least some embodiments, the routine 500 may further perform one or more other actions of a virtual machine monitor, such as if the routine 500 operates as part of or otherwise in conjunction with a virtual machine monitor that manages one or more associated virtual machine computing nodes.

After blocks 515, 525, 545, or 585, or if it is instead determined in block 540 that a response is received within a predefined time limit, the routine continues to block 595 to determine whether to continue, such as until an explicit termination instruction is received. If so, the routine returns to block 505, and if not continues to block 599 and ends.

In addition, for at least some types of requests, the routine may in some embodiments further verify that the requester is authorized to make the request, such as based on access rights specified for the requester and/or an associated target of the request (e.g., an indicated volume). In some such embodiments, the verification of authorization may further include obtaining payment from the requester for the requested functionality (or verifying that any such payment has already been provided), such as to not perform the request if the payment is not provided. For example, types of request that may have associated payment in at least some embodiments and situations include requests to execute indicated programs, attach a volume, perform some or all types of data access requests, and other types of indicated operations. Furthermore, some or all types of actions taken on behalf of users may be monitored and metered, such as for later use in determining corresponding usage-based fees for at least some of those actions.

Figure 6:
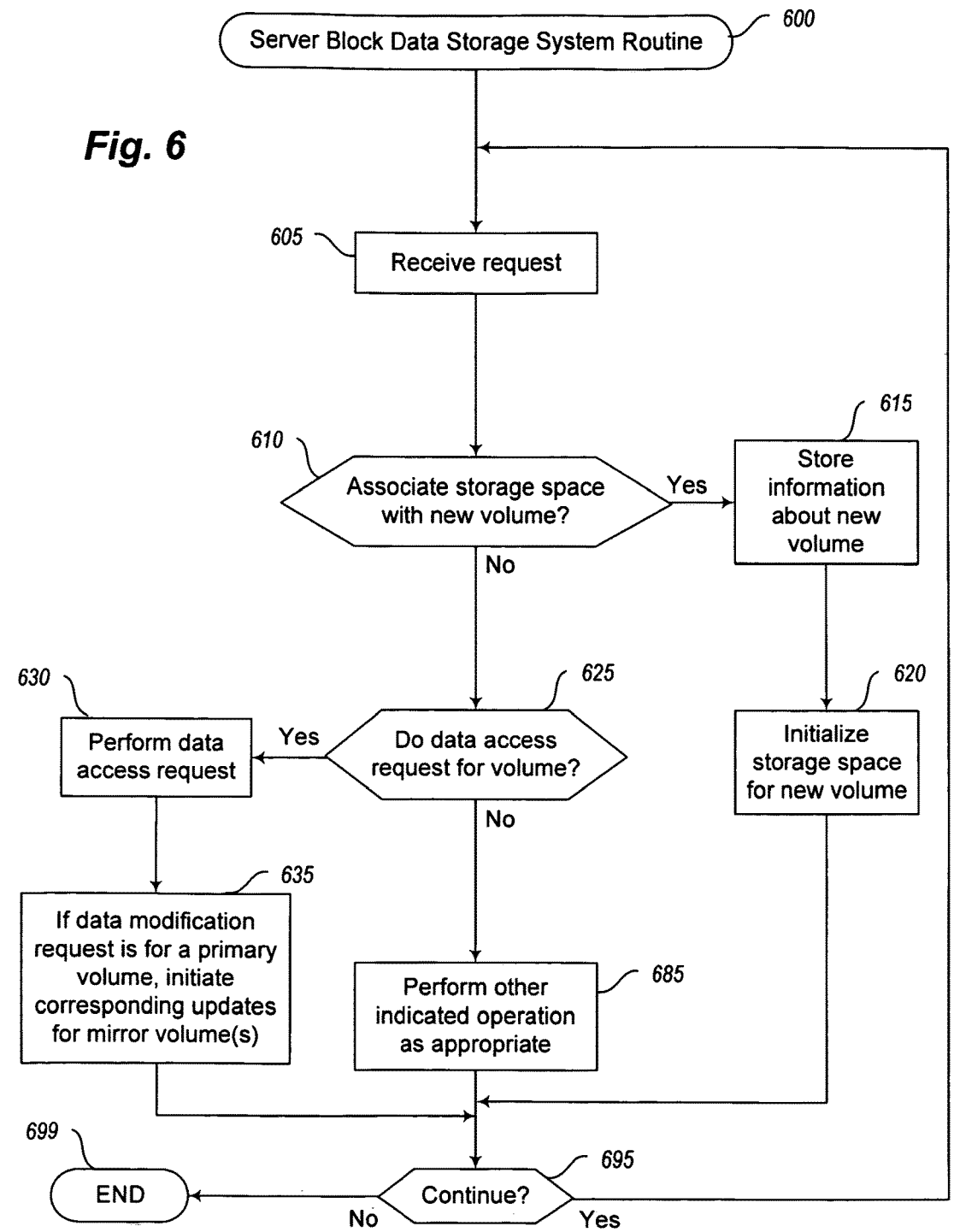
FIG. 6 illustrates a flow diagram of an example embodiment of a Block Data Storage Server routine.

FIG. 6 is a flow diagram of an example embodiment of a Server Block Data Storage System routine 600. The routine may be provided by, for example, execution of a software component on a server block data storage system, such as to manage the storage of block data on one or more block data storage volumes on that server storage system (e.g., for server block data storage systems 165 of FIG. 1 and/or of FIG. 2). In other embodiments, some or all of the functionality of the routine may be provided in other manners, such as by software executing on one or more other computing systems to manage one or more server block data storage systems.

The illustrated embodiment of the routine begins at block 605, where a request is received. The routine continues to block 610 to determine whether the received request is related to creating a new volume, such as by associating a block of available storage space for the server storage system (e.g., storage space on one or more local hard disks) with a new indicated volume. The request may, for example, be from routine 400 and/or from a user associated with the new volume being created. If so, the routine continues to block 615 to store information about the new volume, and in block 620 initializes storage space for the new volume (e.g., a logical linear block of storage space of an indicated size).

As discussed in greater detail elsewhere, in some embodiments new volumes may be created based on another existing volume or snapshot volume copy, and if so the routine may in block 620 initialize the storage space for the new volume by copying appropriate data to the storage space, while in other embodiments may initialize new volume storage space in other manners (e.g., such as to initialize the storage space to a default value, such as all zeros).

If it is instead determined in block 610 that the received request is not to create a new volume, the routine continues instead to block 625 to determine whether a data access request has been received for an existing volume stored on the server storage system, such as from a node manager associated with an executing program that initiated the data access request. If so, the routine continues to block 630 to perform the data access request on the indicated volume. The routine then continues to block 635 to, in the illustrated embodiment, optionally initiate corresponding updates for one or more mirror copies of the volume, such as if the indicated volume on the current server storage system is the primary volume copy for the volume. In other embodiments, consistency between a primary volume copy and mirror volume copies may be maintained in other manners. As discussed in greater detail elsewhere, in some embodiments, at least some modifications to the stored data contents of at least some volumes may also be performed to one or more archival storage systems (e.g., at a remote storage service), such as to maintain a backing copy or other copy of those volumes, and if so the routine may further initiate updates to the archival storage systems to initiate corresponding updates for one or more copies of the volume on the archival storage systems. Furthermore, if the routine determines in block 635 or elsewhere that a mirror copy of the volume is not available (e.g., based on a failure to respond within a predefined amount of time to a data access request sent in block 635, or to a ping message or other status message initiated by the routine 600 to periodically check that the mirror volume copy and its mirror server block data storage system are available; based on a message from the mirror server block data storage system that it has suffered an error condition or has begun a shutdown or failure mode operation; etc.), the routine may initiate actions to create a new mirror copy of a volume, such as by sending a corresponding message to the routine 400 of FIG. 4 or instead by directly initiating the mirror volume copy creation.

If it is instead determined in block 625 that the received request is not a data access request for a volume, the routine continues to block 685 to perform one or more other indicated operations as appropriate. Such other operations may have various forms in various embodiments, such as one or more of the following non-exclusive list: to delete a volume (e.g., so as to make the associated storage space available for other use); to copy a volume to an indicated destination (e.g., to another new volume on another server block data storage system, to one or more archival storage systems for use as a snapshot volume copy, etc.); to provide information about use of volumes (e.g., for metering of volume use, such as for fee-based volume use by customers); to perform ongoing maintenance or diagnostics for the server block data storage system (e.g., to defragment local hard disks); etc. After blocks 620, 635, or 685, the routine continues to block 695 to determine whether to continue, such as until an explicit termination instruction is received. If so, the routine returns to block 605, and if not continues to block 699 and ends.

In addition, for at least some types of requests, the routine may in some embodiments further verify that the requester is authorized to make the request, such as based on access rights specified for the requester and/or an associated target of the request (e.g., an indicated volume), while in other embodiments the routine may assume that requests have been previously authorized by a routine from which it receives requests (e.g., a Node Manager routine and/or a BDS System Manager routine). Furthermore, some or all types of actions taken on behalf of users may be monitored and metered, such as for later use in determining corresponding usage-based fees for at least some of those actions.

Figure 7A:
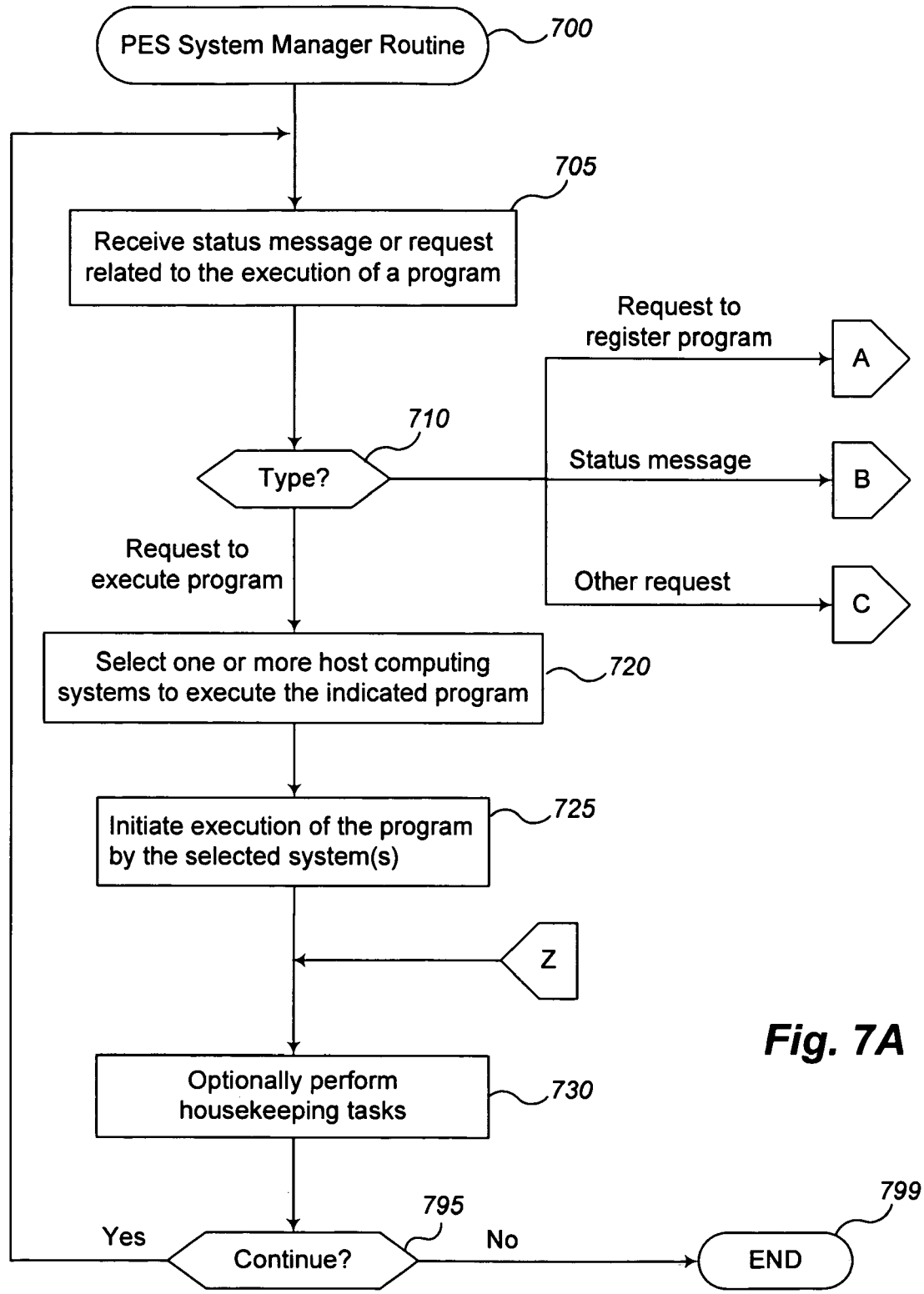
FIGS. 7A-7B illustrate a flow diagram of an example embodiment of a Program Execution Service System Manager routine.
Figure 7B:
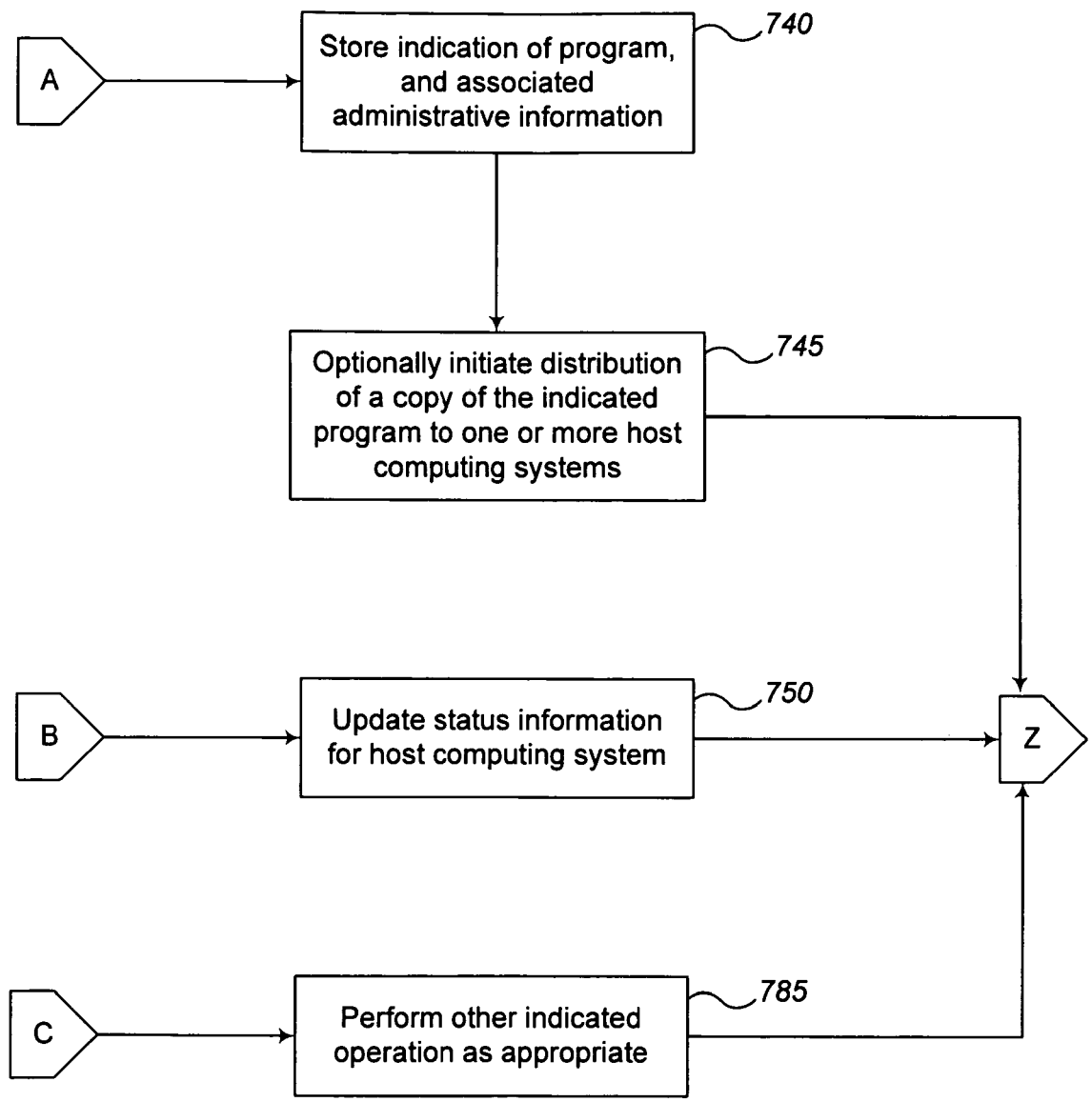

FIGS. 7A and 7B are a flow diagram of an example embodiment of a PES System Manager routine 700. The routine may be provided by, for example, execution of a PES System Manager module 140 of FIG. 1. In other embodiments, some or all of the functionality of the routine 700 may instead be provided in other manners, such as by routine 400 as part of the block data storage service.

In the illustrated embodiment, the routine begins at block 705, where a status message or other request related to the execution of a program is received. The routine continues to block 710 to determine the type of the received message or request. If it is determined in block 710 that the type is a request to execute a program, such as from a user or executing program, the routine continues to block 720 to select one or more host computing systems on which to execute the indicated program, such as from a group of candidate host computing systems available for program execution. In some embodiments, the one or more host computing systems may be selected in accordance with user instructions or other indicated criteria of interest. The routine then continues to block 725 to initiate execution of the program by each of the selected host computing systems, such as by interacting with a Node Manager associated with the selected host computing system. In block 730, the routine then optionally performs one or more housekeeping tasks (e.g., monitoring program execution by users, such as for metering and/or other billing purposes).

If it is instead determined in block 710 that the received request is to register a new program as being available for later execution, the routine continues instead to block 740 to store an indication of the program and associated administrative information for its use (e.g., access control information related to users who are authorized to use the program and/or authorized types of uses), and may further store at least one centralized copy of the program in some situations. The routine then continues to block 745 to optionally initiate distribution of copies of the indicated program to one or more host computing systems for later use, such as to allow rapid startup of the program by those host computing systems by retrieving the stored copy from local storage of those host computing systems. In other embodiments, one or more copies of the indicated program may be stored in other manners, such as on one or more remote archival storage systems.

If it instead determined in block 710 that a status message is received in block 705 concerning one or more host computing systems, the routine continues instead to block 750 to update information concerning those host computing systems, such as to track usage of executing programs and/or other status information about host computing systems (e.g., use of non-local block data storage volumes). In some embodiments, status messages will be sent periodically by node manager modules, while in other embodiments, status messages may be sent at other times (e.g., whenever a relevant change occurs). In yet other embodiments, the routine 700 may instead request information from node manager modules and/or host computing systems as desired.

Status messages may include a variety of types of information, such as the number and identity of programs currently executing on a particular computing system, the number and identity of copies of programs currently stored in the local program repository on a particular computing system, attachments and/or other use of non-local block data storage volumes, performance-related and resource-related information (e.g., utilization of CPU, network, disk, memory, etc.) for a computing system, configuration information for a computing system, and reports of error or failure conditions related to hardware or software on a particular computing system.

If the routine instead determines in block 705 that another type of request or message is received, the routine continues instead to block 785 to perform one or more other indicated operations as appropriate. Such other operations may include, for example, suspending or terminating execution of currently executing programs, and otherwise managing administrative aspects of the program execution service (registration of new users, determining and obtaining of payment for use of the program execution service, etc.). After blocks 745, 750 or 785, the routine continues to block 730 to optionally perform one or more housekeeping tasks. The routine then continues to block 795 to determine whether to continue, such as until an explicit termination instruction is received. If so, the routine returns to block 705, and if not continues to block 799 and ends.

While not illustrated here, in at least some embodiments, a variety of additional types of functionality to execute programs may be provided by a program execution service, such as in conjunction with a block data storage service. In at least some embodiments, the execution of one or more copies or instances of a program on one or more computing systems may be initiated in response to a current execution request for immediate execution of those program instances. Alternatively, the initiation may be based on a previously received program execution request that scheduled or otherwise reserved the then-future execution of those program instances for the now-current time. Program execution requests may be received in various ways, such as directly from a user (e.g., via an interactive console or other GUI provided by the program execution service), or from an executing program of a user that automatically initiates the execution of one or more instances of other programs or of itself (e.g., via an API provided by the program execution service, such as an API that uses Web services). Program execution requests may include various information to be used in the initiation of the execution of one or more instances of a program, such as an indication of a program that was previously registered or otherwise supplied for future execution, and a number of instances of the program that are to be executed simultaneously (e.g., expressed as a single desired number of instances, as a minimum and maximum number of desired instances, etc.). In addition, in some embodiments, program execution requests may include various other types of information, such as the following: an indication of a user account or other indication of a previously registered user (e.g., for use in identifying a previously stored program and/or in determining whether the requested program instance execution is authorized); an indication of a payment source for use in providing payment to the program execution service for the program instance execution; an indication of a prior payment or other authorization for the program instance execution (e.g., a previously purchased subscription valid for an amount of time, for a number of program execution instances, for an amount of resource utilization, etc.); and/or an executable or other copy of a program to be executed immediately and/or stored for later execution. In addition, in some embodiments, program execution requests may further include a variety of other types of preferences and/or requirements for execution of one or more program instances. Such preferences and/or requirements may include indications that some or all of the program instances be executed in an indicated geographical and/or logical location, such as in one of multiple data centers that house multiple computing systems available for use, on multiple computing systems that are proximate to each other, and/or on one or more computing system that are proximate to computing systems having other indicated characteristics (e.g., that provide a copy of an indicated block data storage volume).

FIG. 8 is a flow diagram of an example embodiment of an Archival Manager routine 800. The routine may be provided by, for example, execution of one of the Archival Manager modules 355 of FIG. 3, of the Archival Manager module 190 of FIGS. 2C-2F and/or of one or more archival manager modules (not shown) on the computing systems 180 of FIG. 1. In other embodiments, some or all of the functionality of the routine 800 may instead be provided in other manners, such as by routine 400 as part of the block data storage service. In the illustrated embodiment, the archival storage systems store data in chunks that each correspond to a portion of a block data storage volume, but in other embodiments may store data in other manners.

The illustrated embodiment of the routine 800 begins in block 805, where information or a request is received. The routine then continues to block 810 to determine if the request or information is authorized, such as if the requester has provided payment for fee-based access, or otherwise has access rights to have an indicated request be performed. If it is determined in block 815 that the request or information is authorized, the routine continues to block 820, and otherwise returns to block 805. In block 820, the routine determines if the received request is to store a new snapshot copy for an indicated volume. If so, the routine continues to block 825 to obtain multiple volume chunks for the volume, store each chunk as an archival storage system data object, and then store information about the data objects for the chunks that are associated with the snapshot volume copy. As discussed in greater detail elsewhere, the chunks of the volume may be obtained in various ways, such as by being received in block 805 as multiple distinct blocks, received in block 805 as a single large group of block data that is separated into chunks in block 825, retrieved in block 825 as individual chunks or a single large group of block data to be separated into chunks, previously stored on the archival storage systems, etc.

If it is instead determined in block 820 that the received request is not to store a new snapshot volume copy, the routine continues instead to block 830 to determine whether the received request is to store an incremental snapshot copy of a volume that reflects changes from a prior snapshot volume copy. If so, the routine continues to block 835 to identify snapshot chunks that have changed since a prior snapshot copy of the volume, and to obtain copies of the changed snapshot chunks in a manner similar to that previously discussed with respect to block 825. The routine then continues to block 840 to store copies of the changed chunks, and to store information about the new changed chunks and the prior other unchanged chunks whose corresponding data objects are associated with the new snapshot volume copy. The chunks that have changed since a prior snapshot volume copy may be identified in various ways, such as by the server block data storage systems that store primary and/or mirror copies of the volume (e.g., by tracking any write data access requests or other modification requests for the volume).

If it is instead determined in block 830 that the received request is not to store an incremental snapshot volume copy, the routine continues instead to block 845 to determine whether the request is to provide one or more chunks of a snapshot volume copy, such as from corresponding stored data objects. If so, the routine continues to block 850 to retrieve the data for the indicated snapshot volume copy chunk(s), and sends the retrieved data to the requester. Such requests may be, for example, part of creating a new volume based on an existing snapshot volume copy by retrieving all of the chunks for the snapshot volume copy, part of retrieving a subset of a snapshot volume copy's chunks to restore a minimal mirror volume copy, etc.

If it is instead determined in block 845 that the received request is not to provide one or more snapshot volume copy chunks, the routine continues to block 855 to determine if the received request is to perform one or more data access requests for one or more volume chunks that are not part of a snapshot volume copy, such as to perform read data access requests and/or write data access requests for one or more data objects that represent particular volume chunks (e.g., if those stored data objects serve as a backing store for those volume chunks). If so, the routine continues to block 860 to perform the requested data access request(s) for the stored data object(s) corresponding to the indicated volume chunk(s). As discussed in greater detail elsewhere, in at least some embodiments, lazy updating techniques may be used when modifying stored data objects, such that a write data access request may not be immediately performed. If so, before a later read data access request for the same data object is completed, the one or more preceding write data access requests may be performed to ensure strict data consistency.

If it is instead determined in block 855 that the received request is not to perform data access requests for one or more volume chunks, the routine continues instead to block 885 to perform one or more other indicated operations as appropriate. Such other operations may include, for example, repeatedly receiving information that corresponds to modifications being performed on a volume in order to update corresponding stored data objects that represent the volume (e.g., as a backing store or for other purposes) and taking appropriate corresponding actions, responding to requests to delete or otherwise modify stored snapshot volume copies, responding to requests of a user to manage an account with a storage service that provides the archival storage systems, etc. After blocks 825, 840, 850, 860, or 885, the routine continues to block 895 to determine whether to continue, such as until an explicit termination instruction is received. If so, the routine returns to block 805, and if not continues to block 899 and ends.

As noted above, for at least some types of requests, the routine may in some embodiments verify that the requester is authorized to make the request, such as based on access rights specified for the requester and/or an associated target of the request (e.g., an indicated volume or snapshot volume copy), while in other embodiments the routine may assume that requests have been previously authorized by a routine from which it receives requests (e.g., a Node Manager routine and/or a BDS System Manager routine). Furthermore, some or all types of actions taken on behalf of users may be monitored and metered in at least some embodiments, such as for later use in determining corresponding usage-based fees for at least some of those actions.

Additional details related to the operation of example embodiments of a program execution service with which the described techniques may be used are available in U.S. patent application Ser. No. 11/395,463, filed Mar. 31, 2006 and entitled "Managing Execution Of Programs By Multiple Computing Systems;" in U.S. patent application Ser. No. 11/851,345, filed Sep. 6, 2007 and entitled "Executing Programs Based on User-Specified Constraints," which is a continuation-in-part of U.S. patent application Ser. No. 11/395,463; and U.S. application Ser. No. 12/145,411, filed Jun. 24, 2008 and entitled "Managing Communications Between Computing Nodes;" each of which is incorporated herein by reference in its entirety. In addition, additional details related to the operation of one example of a remote storage service that may be used to store snapshot volume copies or otherwise provide remote archival storage systems are available in U.S. Patent Application Publication No. 2007/0156842, published Jul. 5, 2007 and entitled "Distributed Storage System With Web Services Client Interface," which is incorporated herein by reference in its entirety, and which claims priority of U.S. Patent Application No. 60/754,726, filed Dec. 29, 2005. Furthermore, additional details related to one example of users providing paid access to the users' programs or other data for other users are available in U.S. patent application Ser. No. 11/963,331, filed Dec. 21, 2007 and entitled "Providing Configurable Pricing for Execution of Software Images," which is incorporated herein by reference in its entirety, and which may similarly be used herein for users to charge other users for various types of paid access to volumes and/or snapshot copies, as discussed in greater detail elsewhere.

In addition, as previously noted, some embodiments may employ virtual machines, and if so the programs to be executed by the program execution service may include entire virtual machine images. In such embodiments, a program to be executed may comprise an entire operating system, a file system and/or other data, and possibly one or more user-level processes. In other embodiments, a program to be executed may comprise one or more other types of executables that interoperate to provide some functionality. In still other embodiments, a program to be executed may comprise a physical or logical collection of instructions and data that may be executed natively on the provided computing system or indirectly by means of interpreters or other software-implemented hardware abstractions. More generally, in some embodiments, a program to be executed may include one or more application programs, application frameworks, libraries, archives, class files, scripts, configuration files, data files, etc.

In addition, as previously noted, in at least some embodiments and situations, volumes may be migrated or otherwise moved from one server storage system to another. Various techniques may be used to move volumes, and such movement may be initiated in various manners. In some situations, the movement may reflect problems related to the server storage systems on which the volumes are stored (e.g., failure of the server storage systems and/or of network access to the server storage systems). In other situations, the movement may be performed to accommodate other volume copies to be stored on existing server storage systems, such as for higher-priority volumes, or to consolidate the storage of volume copies on a limited number of server storage systems, such as to enable the original server storage systems that store the volume copies to be shut down for reasons such as maintenance, energy conservation, etc. As one specific example, if the one or more volume copies stored on a server storage system need more resources than are available from that server storage system, one or more of the volume copies may be migrated to one or more other server storage systems with additional resources. Overuse of available resources may occur for various reasons, such as one or more server storage systems having less resources than expected, one or more of the server storage systems using more resources than expected (or allowed), or, in embodiments in which available resources of one or more server storage systems are intentionally over-committed relative to possible resources needs of one or more reserved or stored volume copies. For example, if the expected resources needs of the volume copies are within the available resources, the maximum resource needs may exceed the available resources. Overuse of available resources may also occur if the actual resources needed for volume storage or use exceed the available resources.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different manners in other embodiments, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method, comprising:
   providing, by one or more computing systems that implement one or more network-accessible services for use by a plurality of users, one or more computing nodes for use by a first user;
   providing, by a block data storage service of the one or more network-accessible services, a storage volume to be attached to the one or more computing nodes, wherein the storage volume is configured with access rights indicating one or more authorized users of the storage volume;
   executing, on the one or more computing nodes, one or more software programs on behalf of the first user, and storing data associated with the executing of the one or more software programs on the storage volume;
   receiving, by the one or more computing systems, instructions from the first user specifying one or more criteria for other users to obtain access to the storage volume;
   separating, by the one or more computing systems, the storage volume into a plurality of chunks, wherein individual ones of the chunks include respective groups of blocks of the storage volume and are formatted as data objects for storage in an archival storage system distinct from the block data storage service;
   creating, by the one or more computing systems, a stored snapshot copy of the stored data of the storage volume in the archival storage system, wherein the stored snapshot copy includes the respective data objects for the plurality of chunks, wherein the data objects are configured to restore the plurality of chunks in another storage volume;
   creating, by the one or more computing systems, a second snapshot copy of the storage volume in the archival storage system, wherein the second snapshot copy includes additional data objects for a subset of the plurality of chunks that have been created or modified since a prior snapshot copy of the storage volume and is configured to restore the subset of chunks in the other storage volume;
   receiving; by the block data storage service and from one or more second users separate from the first user, a request to access the storage volume;
   determining that the one or more second users are authorized to receive the access based at least in part on the one or more second users satisfying the one or more criteria; and
   responsive to the determining:
      creating a second storage volume configured for use by the one or more second users based at least in part on the stored snapshot copy and the second snapshot copy; and
      providing the access to the second storage volume to the one or more second users.

2. The computer-implemented method of claim 1 further comprising receiving information indicating that the first user and the one or more second users are part of a group of users, and wherein the determining that the one or more criteria are satisfied is based at least in part on the one or more second users being part of the group of users.

3. The computer-implemented method of claim 1 wherein the determining that the one or more criteria are satisfied further includes determining that the access permits copies of the stored snapshot copy.

4. The computer-implemented method of claim 1 wherein the determining that the one or more criteria are satisfied further includes determining that an identity of at least one of the one or more second users is permitted to receive the access.

5. The computer-implemented method of claim 1 wherein the determining that the one or more criteria are satisfied further includes determining that read-only access is permitted for the storage volume, and wherein the providing of the access includes providing the one or more second users with the read-only access to the second storage volume.

6. The computer-implemented method of claim 1 further comprising updating, by the one or more computing systems, the second storage volume to include subsequent chunks in the archival storage system created from subsequent changes to the storage volume.

7. The computer-implemented method of claim 1, wherein the request requests the access to be provided in an indicated geographical location separate from a location at which the snapshot copy is stored, and wherein the providing of the access includes providing the one or more second users with access to the created second storage volume at the indicated geographical location.

8. The computer-implemented method of claim 1 further comprising using the stored snapshot copy to restore the storage volume after one or more problems occur in accessing the storage volume, and wherein the providing of the access includes providing the one or more second users with access to the restored storage volume.

9. The computer-implemented method of claim 1 further comprising monitoring actions taken on behalf of the one or more second users on the stored snapshot copy.

10. The computer-implemented method of claim 1 wherein the providing of the storage volume includes creating the storage volume on one or more data storage systems provided by the block data storage service, and further comprising attaching the created storage volume to the one or more computing nodes for use by the executing one or more software programs.

11. The computer-implemented method of claim 1 wherein the one or more network-accessible services provide a plurality of physical computer systems for use by the plurality of users, wherein the one or more computing nodes are one or more virtual machines hosted on one or more physical computer systems of the plurality of physical computer systems, and wherein the providing of the one or more computing nodes for use by the first user includes selecting the one or more physical computer systems for use with the first user.

12. A non-transitory computer-readable medium having stored contents that, when executed, cause one or more computing systems to implement one or more network-accessible services for use by a plurality of users and to perform operations including at least:
   providing, by the one or more computing systems and based at least in part on one or more criteria specified by a first user, one or more computing nodes for use by the first user;
   providing, by a block data storage service of the one or more network-accessible services, a storage volume to be attached to the one or more computing nodes, wherein the storage volume is configured with access rights indicating one or more authorized users of the storage volume;
   executing, on the one or more computing nodes, one or more software programs on behalf of the first user, including storing data that is associated with the executing of the one or more software programs on the storage volume;
   receiving, by the one or more computing systems, instructions from the first user specifying one or more criteria for other users to obtain access to the storage volume;
   separating, by the one or more computing systems, the storage volume into a plurality of chunks, wherein individual ones of the chunks include respective groups of blocks of the storage volume and are formatted as data objects for storage in an archival storage system distinct from the block data storage service;
   creating, by the one or more computing systems, a stored snapshot copy of the stored data of the storage volume in the archival storage system, wherein the stored snapshot copy includes the respective data objects for the plurality of chunks, wherein the data objects are configured to restore the plurality of chunks of the stored data in another storage volume;
   creating, by the one or more computing systems, a second snapshot copy of the storage volume in the archival storage system, wherein the second snapshot copy includes additional data objects for one or more of the plurality of chunks that have been created or modified since a prior snapshot copy of the storage volume and is configured to restore the one or more chunks in the other storage volume;
   determining, by the one or more computing systems and in response to a request to provide one or more second users separate from the first user with access to the storage volume, that the one or more second users are authorized to receive the access based at least in part on the one or more second users satisfying the one or more access criteria; and
   responsive to the determining:
      creating, by the block data storage service, a second storage volume configured for use by the one or more second users based at least in part on the snapshot copy and the second snapshot copy; and
      providing, by the block data storage service and to the one or more second users, the access to the second storage volume.

13. The non-transitory computer-readable medium of claim 12 wherein the providing of the one or more computing nodes for use by the first user includes selecting the one or more virtual machine computing nodes from a plurality of virtual machine computing nodes provided by the one or more network-accessible services.

14. The non-transitory computer-readable medium of claim 12 wherein the one or more computing systems are configured to update the second storage volume to include subsequent chunks in the archival storage system created from subsequent changes to the storage volume.

15. A system, comprising:
   one or more hardware processors of one or more computing systems; and
   one or more memories with stored instructions that, when executed by at least one of the one or more hardware processors, cause the system to perform operations including at least:
      selecting, from a plurality of computing resources provided by one or more network-accessible services, one or more computing resources for use by a first user;
      storing data in a storage volume provided by a block data storage service of the one or more network-accessible services for use with one or more software programs executing on behalf of the first user, wherein the storage volume is attached to the one or more computing nodes and configured with access rights indicating one or more authorized users of the storage volume;
      separating the storage volume into a plurality of chunks, wherein individual ones of the chunks include respective groups of blocks of the storage volume and are formatted as data objects for storage in an archival storage system distinct from the block data storage service;
      creating a stored snapshot copy of the stored data in the storage volume in the archival storage system, wherein the stored snapshot copy includes the respective data objects for the plurality of chunks, wherein the data objects are configured to restore the plurality of chunks of the stored data in another storage volume;

creating a second snapshot copy of the storage volume in the archival storage system, wherein the second snapshot copy includes additional data objects for one or more of the plurality of chunks that have been created or modified since a prior snapshot copy of the storage volume and is configured to restore the one or more chunks in the other storage volume;

receiving one or more criteria from the first user for controlling access of other users to the storage volume;

receiving, from a second user, a request to access the storage volume;

determining that the second user is authorized to receive the access based at least in part on the second user satisfying the one or more criteria; and responsive to the determining:
  creating a second storage volume configured for use b the second user based at least in part on the stored snapshot copy and the second snapshot copy; and
  providing the access to the second storage volume to the second user.

16. The system of claim 15 wherein the providing of the access includes attaching the second storage volume to one or more additional computing resources of the plurality of computing resources provided to the second user.

* * * * *